United States Patent
Chen

(10) Patent No.: US 11,563,494 B2
(45) Date of Patent: Jan. 24, 2023

(54) OPTICAL NETWORK APPARATUS AND OPTICAL MODULE

(71) Applicant: HUAWEI TECHNOLOGIES CO., LTD., Guangdong (CN)

(72) Inventor: Guodao Chen, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/126,851

(22) Filed: Dec. 18, 2020

(65) Prior Publication Data
US 2021/0105072 A1 Apr. 8, 2021

Related U.S. Application Data

(63) Continuation of application No. PCT/CN2019/091617, filed on Jun. 18, 2019.

(30) Foreign Application Priority Data

Jun. 21, 2018 (CN) .......................... 201810644555.8

(51) Int. Cl.
*H04B 10/25* (2013.01)
*H04B 10/2575* (2013.01)

(52) U.S. Cl.
CPC . *H04B 10/25891* (2020.05); *H04B 10/25752* (2013.01); *H04B 2210/006* (2013.01)

(58) Field of Classification Search
None
See application file for complete search history.

(56) References Cited

U.S. PATENT DOCUMENTS 9,281,970 B2 3/2016 Ran
2007/0201881 A1* 8/2007 Douma ................ G02B 6/4246
398/202

(Continued)

FOREIGN PATENT DOCUMENTS

CN 105071865 A 11/2015
CN 204859187 U 12/2015

(Continued)

OTHER PUBLICATIONS

Li et al., "50GAUI and 100GAUI C2C and C2M Baseline Proposals for 50G and 100G Ethernets", Jul. 25-28, 2016, IEEE, For IEEE 802.3cd, pp. 1-7 (Year: 2016).*

(Continued)

*Primary Examiner* — David W Lambert
(74) *Attorney, Agent, or Firm* — Womble Bond Dickinson (US) LLP

(57) ABSTRACT

The application provides an optical network apparatus and an optical module. The optical network apparatus is configured to: convert, by a processing chip, the received N electrical signals from a board interface chip into a first electrical signal and a second electrical signal; and send the above two electrical signals to a first optical transmission component and a second optical transmission component, respectively; convert, by the first optical transmission component, the first electrical signal into a first optical signal; and convert, by the second optical transmission component, the second electrical signal into a second optical signal. The N to-be-sent electrical signals are combined, and only two optical transmission components are connected to the processing chip. Therefore, the processing chip does not need to be connected to four optical transmission components, fewer optical transmission components are required, and costs are reduced.

18 Claims, 13 Drawing Sheets

(56) References Cited

U.S. PATENT DOCUMENTS

| | | | |
|---|---|---|---|
| 2015/0078758 A1 | 3/2015 | Lee et al. | |
| 2015/0249501 A1* | 9/2015 | Nagarajan | H04B 10/40 398/79 |
| 2019/0140761 A1* | 5/2019 | Chan | H04B 10/278 |

FOREIGN PATENT DOCUMENTS

| | | |
|---|---|---|
| CN | 105553561 A | 5/2016 |
| CN | 106375017 A | 2/2017 |
| CN | 107124225 A | 9/2017 |
| CN | 107167886 A | 9/2017 |
| CN | 206461624 U | 9/2017 |
| EP | 3107227 A1 | 12/2016 |
| JP | 2007028539 A | 2/2007 |
| JP | 2013126035 A | 6/2013 |
| JP | 2013543665 A | 12/2013 |
| JP | 2018038026 A | 3/2018 |
| WO | 2015141061 A1 | 9/2015 |
| WO | 2016139767 A1 | 9/2016 |
| WO | 2017107218 A1 | 6/2017 |
| WO | 2017113878 A1 | 7/2017 |

OTHER PUBLICATIONS

Huawei et al., "Issues in standardization of lower layer splits 5, 6, 7", 3GPP TSG RAN WG3 #95, R3-170736, Athens, Greece, Feb. 13-17, 2017, total 7 pages.

IEEE Std 802.3—2015(Revision of IEEE Std 802.3-2012)IEEE Standard for Ethernet LAN/MAN Standards Committee of the IEEE Computer Society, Approved Sep. 3, 2015, IEEE-SA Standards Board, Section Six, total 699 pages.

IEEE P802.3bs /D3.5, Oct. 10, 2017, Draft Standard for Ethernet, Amendment 10:Media Access Control Parameters, Physical Layers and Management Parameters for 200 GB/s and 400 GB/s Operation, total 390 pages.

IEEE P802.3cd /D3.5, Sep. 18, 2018, IEEE P802.3cd /D3.5, Draft Standard for EthernetAmendment 3: Media Access Control Parameters for 50 GB/s and Physical Layers and Management Parameters for 50 Gb/s, 100 Gb/s, and 200 Gb/s Operation, total 408 pages.

* cited by examiner

OPTICAL NETWORK APPARATUS AND OPTICAL MODULE

CROSS-REFERENCE TO RELATED APPLICATIONS

This application is a continuation of International Application No. PCT/CN2019/091617, filed on Jun. 18, 2019, which claims priority to Chinese Patent Application No. 201810644555.8, filed on Jun. 21, 2018. The disclosures of the aforementioned applications are hereby incorporated by reference in their entireties.

TECHNICAL FIELD

Embodiments of this application relate to the field of communications technologies, and in particular, to an optical network apparatus and an optical module.

BACKGROUND

With the advent of the 5G era, higher requirements are imposed on network bandwidth. High-speed interfaces such as a 100GE interface, a 200GE interface, and a 400GE interface are more widely used. The 100GE interface is used as an example. Currently, to implement communication over the 100GE interface, in a transmit direction, an optical network device uses four optical transmitters to convert 4*25.78125G electrical signals into optical signals through non-return-to-zero code (NRZ) encoding, and then multiplexes the optical signals by using an oMUX. In other words, the optical network device transmits the four 4*25.78125G optical signals over a same optical fiber. In a receive direction, the optical network device receives four 4*25.78125G optical signals over the same optical fiber, and then uses four optical receivers to restore the 4*25.78125G optical signals into electrical signals.

However, costs of the optical network device are mainly paid in the optical transmitters and the optical receivers. Currently, to support an optical interface higher than 100GE, the optical network device includes four optical transmitters and four optical receivers. Therefore, there are a relatively large quantity of optical transmitters and optical receivers in the optical network device, and costs are relatively high.

SUMMARY

Embodiments of this application provide an optical network apparatus and an optical module, to reduce a quantity of optical transmission components and reduce costs.

According to a first aspect, an embodiment of this application provides an optical network apparatus, used as a first optical network apparatus, and including a processing chip, a first optical transmission component, and a second optical transmission component, where the processing chip is configured to:

receive N electrical signals sent by a board interface chip, where N is an integer greater than 2;

process the N electrical signals to convert the received N electrical signals into two electrical signals, where the two electrical signals are represented as a first electrical signal and a second electrical signal; and send the first electrical signal and the second electrical signal to the first optical transmission component and the second optical transmission component, respectively;

the first optical transmission component is configured to convert the first electrical signal into a first optical signal, where an input end of the first optical transmission component is coupled to an output end of the processing chip, and the second optical transmission component is configured to convert the second electrical signal into a second optical signal, where an input end of the second optical transmission component is coupled to an output end of the processing chip.

The N to-be-sent electrical signals obtained by the processing chip are combined, and only two optical transmission components are connected to the processing chip. Therefore, the processing chip does not need to be connected to N optical transmission components, fewer optical transmission components are required, and costs are reduced.

In an embodiment, the processing chip includes a 100 Gbps attachment unit interface (CAUI)-4 interface, and when the board interface chip is a 100G board interface chip, the processing chip is connected to the 100G board interface chip through the CAUI-4 interface.

In an embodiment, the board interface chip is the 100G board interface chip, N=4, the N electrical signals are represented as an electrical signal A1 to an electrical signal A4, and the processing chip further includes a first circuit, a second circuit, and a third circuit, where the first circuit is configured to: perform physical medium attachment (PMA) processing and physical coding sublayer (PPCS) conversion processing on the electrical signal A1 to the electrical signal A4, to obtain eight processed electrical signals, where the eight processed electrical signals are represented as an electrical signal B1 to an electrical signal B8;

the second circuit is configured to: perform forward error correction (FEC) encoding and PMA (2:2) processing on the electrical signal B1 to an electrical signal B4, to obtain a processed electrical signal C1 and a processed electrical signal C2;

the second circuit is further configured to: perform the FEC encoding and the PMA (2:2) processing on an electrical signal B5 to the electrical signal B8, to obtain a processed electrical signal C3 and a processed electrical signal C4;

the third circuit is configured to: perform PMA (2:1) processing on the electrical signal C1 and the electrical signal C2, to obtain the processed first electrical signal; and the third circuit is further configured to: perform the PMA (2:1) processing on the electrical signal C3 and the electrical signal C4, to obtain the processed second electrical signal.

In an embodiment, that the first circuit is configured to: perform PMA processing and PCS conversion processing on the electrical signal A1 to the electrical signal A4, to obtain the electrical signal B1 to the electrical signal B8 includes:

performing, by the first circuit, PMA (20:4) processing on the electrical signal A1 to the electrical signal A4, to obtain 20 processed electrical signals, where the 20 processed electrical signals are represented as an electrical signal D1 to an electrical signal D20; and performing, by the first circuit, the PCS conversion processing on the electrical signal D1 to the electrical signal D20, to obtain the electrical signal B1 to the electrical signal B8.

In an embodiment, the processing chip includes two 50 Gbps attachment unit interface (50GAUI)-2 interfaces, the two 50GAUI-2 interfaces are represented as a first 50GAUI-2 interface and a second 50GAUI-2 interface, and when the board interface chip is a 50G board interface chip, the processing chip is connected to the 50G board interface chip through the first 50GAUI-2 interface and the second 50GAUI-2 interface.

In an embodiment, the board interface chip is the 50G board interface chip, N is equal to 4, and the N electrical signals are represented as an electrical signal A1 to an electrical signal A4;

the processing chip receives the electrical signal A1 and an electrical signal A2 over the first 50GAUI-2 interface;

the processing chip receives an electrical signal A3 and the electrical signal A4 over the second 50GAUI-2 interface; and the processing chip further includes a third circuit, where the third circuit is configured to:

perform PMA (2:1) processing on the electrical signal A1 and the electrical signal A2, to obtain the processed first electrical signal; and perform the PMA (2:1) processing on the electrical signal A3 and the electrical signal A4, to obtain the processed second electrical signal.

In an embodiment, the processing chip includes two 50GAUI-1 interfaces, and the two 50GAUI-1 interfaces are represented as a first 50GAUI-1 interface and a second 50GAUI-1 interface; and the processing chip is connected to the first optical transmission component through the first 50GAUI-1 interface, and is connected to the second optical transmission component through the second 50GAUI-1 interface.

In an embodiment, the first optical transmission component includes a first electrical-to-optical conversion module and a first optical multiplexer connected to the first electrical-to-optical conversion module, where the first electrical-to-optical conversion module is configured to convert the first electrical signal into the first optical signal, and the first optical multiplexer is configured to send the first optical signal to a second optical network apparatus; and the second optical transmission component includes a second electrical-to-optical conversion module and a second optical multiplexer connected to the second electrical-to-optical conversion module, where the second electrical-to-optical conversion module is configured to convert the second electrical signal into the second optical signal, and the second optical multiplexer is configured to send the second optical signal to the second optical network apparatus.

In an embodiment, the first optical transmission component further includes a first photodetector connected to the first optical multiplexer, and the second optical transmission component further includes a second photodetector connected to the second optical multiplexer;

the first optical multiplexer is configured to: receive a third optical signal sent by the second optical network apparatus, and output the third optical signal to the first photodetector, and the first photodetector is configured to convert the third optical signal into a third electrical signal;

the second optical multiplexer is configured to: receive a fourth optical signal sent by the second optical network apparatus, and output the fourth optical signal to the second photodetector, and the second photodetector is configured to convert the fourth optical signal into a fourth electrical signal; and the processing chip is configured to: process the third electrical signal and the fourth electrical signal, and send the N electrical signals obtained after the processing to the board interface chip, where a wavelength of the first optical signal is different from a wavelength of the third optical signal, and the wavelength of the first optical signal is the same as a wavelength of the fourth optical signal;

a wavelength of the second optical signal is different from the wavelength of the fourth optical signal, and the wavelength of the second optical signal is the same as the wavelength of the third optical signal.

Therefore, the optical network apparatus may not only send an optical signal, but also receive an optical signal, and the first optical transmission component and the second optical transmission component are connected to different optical fibers. Therefore, the optical network apparatus may reuse an optical fiber in the prior art for communication. If one of the optical fibers is faulty, receive and transmit functions may also be implemented by using another optical fiber, to ensure normal communication between two optical network apparatuses. Moreover, there is a transmit direction and a receive direction in a same optical fiber, so that delay consistency can be ensured. In addition, a wavelength of an optical signal sent by the first optical transmission component is the same as a wavelength of an optical signal received by the second optical transmission component, and a wavelength of an optical signal received by the first optical transmission component is the same as a wavelength of an optical signal sent by the second optical transmission component. Therefore, when the optical network apparatus communicates with another optical network apparatus over the optical fibers, there is no need to distinguish between the two optical network apparatuses, thereby avoiding a problem in the prior art that single-fiber bidirectional optical modules need to be used in matched pairs, so that a user habit does not need to be changed.

In an embodiment, the first optical transmission component and the second optical transmission component each are packaged by using a coaxial Transistor Outline Packaging (TO). Compared with BOX packaging in the prior art, the TO packaging technique has a complete industry chain and relatively low costs.

According to a second aspect, an embodiment of this application provides an optical network apparatus, applied to a second optical network apparatus, and including a processing chip, a first optical transmission component, and a second optical transmission component, where the first optical transmission component is configured to: convert a first optical signal into a first electrical signal, and send the first electrical signal to the processing chip, where an output end of the first optical transmission component is coupled to an input end of the processing chip;

the second optical transmission component is configured to: convert a second optical signal into a second electrical signal, and send the second electrical signal to the processing chip, where an output end of the second optical transmission component is coupled to an input end of the processing chip; and the processing chip is configured to:

receive the first electrical signal sent by the first optical transmission component and the second electrical signal sent by the second optical transmission component; and process the first electrical signal and the second electrical signal, and send N electrical signals obtained after the processing to a board interface chip, where N is an integer greater than 2.

The N electrical signals output by the processing chip are obtained by processing the two electrical signals, and a quantity of optical transmission components connected to the processing chip is less than N. Therefore, the processing chip does not need to be connected to N optical transmission components, fewer optical transmission components are required, and costs are reduced.

In an embodiment, the processing chip includes a CAUI-4 interface, and when the board interface chip is a 100G board interface chip, the processing chip is connected to the 100G board interface chip through the CAUI-4 interface.

In an embodiment, the board interface chip is the 100G board interface chip, N=4, the N electrical signals are represented as an electrical signal A1 to an electrical signal A4, and the processing chip further includes a first circuit, a second circuit, and a third circuit, where the third circuit is configured to: perform PMA (2:1) processing on the first electrical signal, to obtain an electrical signal C1 and an electrical signal C2;

the third circuit is further configured to: perform the PMA (2:1) processing on the second electrical signal, to obtain an electrical signal C3 and an electrical signal C4;

the second circuit is configured to: perform PMA (2:2) processing and FEC encoding on the electrical signal C1 and the electrical signal C2, to obtain an electrical signal B1 to an electrical signal B4;

the second electrical signal is further configured to: perform the PMA (2:2) processing and the FEC encoding on the electrical signals C3 and C4, to obtain an electrical signal B5 to an electrical signal B8; and the first circuit is configured to: perform PCS conversion processing and PMA processing on the electrical signal B1 to the electrical signal B8, to obtain the electrical signal A1 to the electrical signal A4.

In an embodiment, that the first circuit is configured to: perform PCS conversion processing and PMA processing on the electrical signal B1 to the electrical signal B8, to obtain the electrical signal A1 to the electrical signal A4 includes:

performing, by the first circuit, the PCS conversion processing on the electrical signal B1 to the electrical signal B8, to obtain 20 processed electrical signals, where the 20 processed electrical signals are represented as an electrical signal D1 to an electrical signal D20; and performing, by the first circuit, PMA (20:4) processing on the electrical signal D1 to the electrical signal D20, to obtain the electrical signal A1 to the electrical signal A4.

In an embodiment, the processing chip includes two 50GAUI-2 interfaces, the two 50GAUI-2 interfaces are represented as a first 50GAUI-2 interface and a second 50GAUI-2 interface, and when the board interface chip is a 50G board interface chip, the processing chip is connected to the 50G board interface chip through the first 50GAUI-2 interface and the second 50GAUI-2 interface.

In an embodiment, the board interface chip is the 50G board interface chip, N is equal to 4, and the N electrical signals are represented as an electrical signal A1 to an electrical signal A4;

the processing chip sends the electrical signal A1 and an electrical signal A2 over the first 50GAUI-2 interface;

the processing chip sends an electrical signal A3 and the electrical signal A4 over the second 50GAUI-2 interface, and the processing chip further includes a third circuit, where the third circuit is configured to:

perform PMA (2:1) processing on the first electrical signal, to obtain the electrical signal A1 and the electrical signal A2; and perform the PMA (2:1) processing on the second electrical signal, to obtain the electrical signal A3 and the electrical signal A4.

In an embodiment, the processing chip includes two 50GAUI-1 interfaces, and the two 50GAUI-1 interfaces are represented as a first 50GAUI-1 interface and a second 50GAUI-1 interface; and the processing chip is connected to the first optical transmission component through the first 50GAUI-1 interface, and is connected to the second optical transmission component through the second 50GAUI-1 interface.

In an embodiment, the first optical transmission component includes a first photodetector and a first optical multiplexer connected to the first photodetector, where the first optical multiplexer is configured to: receive the first optical signal, and send the first optical signal to the first photodetector, and the first photodetector is configured to convert the first optical signal into the first electrical signal; and the second optical transmission component includes a second photodetector and a second optical multiplexer connected to the second photodetector, where the second optical multiplexer is configured to: receive the second optical signal, and send the second optical signal to the second photodetector, and the second photodetector is configured to convert the second optical signal into the second electrical signal.

In an embodiment, the first optical transmission component further includes a first electrical-to-optical conversion module connected to the first optical multiplexer, and the second optical transmission component further includes a second electrical-to-optical conversion module connected to the second optical multiplexer;

the processing chip is further configured to: receive N electrical signals sent by the board interface chip, process the N electrical signals to convert the received N electrical signals into two electrical signals, where the two electrical signals are represented as a third electrical signal and a fourth electrical signal;

the first electrical-to-optical conversion module is configured to convert the third electrical signal into a third optical signal, and the first optical multiplexer is further configured to send the third optical signal; and the second electrical-to-optical conversion module is configured to convert the fourth electrical signal into a fourth optical signal, and the second optical multiplexer is further configured to send the fourth optical signal, where a wavelength of the first optical signal is different from a wavelength of the third optical signal, and the wavelength of the first optical signal is the same as a wavelength of the fourth optical signal;

a wavelength of the second optical signal is different from the wavelength of the fourth optical signal, and the wavelength of the second optical signal is the same as the wavelength of the third optical signal.

Therefore, the optical network apparatus may not only send an optical signal, but also receive an optical signal, and the first optical transmission component and the second optical transmission component are connected to different optical fibers. Therefore, the optical network apparatus may reuse an optical fiber in the prior art for communication. If one of the optical fibers is faulty, receive and transmit functions may also be implemented by using another optical fiber, to ensure normal communication between two optical network apparatuses. Moreover, there is a transmit direction and a receive direction in a same optical fiber, so that delay consistency can be ensured. In addition, a wavelength of an optical signal sent by the first optical transmission component is the same as a wavelength of an optical signal received by the second optical transmission component, and a wavelength of an optical signal received by the first optical transmission component is the same as a wavelength of an optical signal sent by the second optical transmission component. Therefore, when the optical network apparatus communicates with another optical network apparatus over the optical fibers, there is no need to distinguish between the two optical network apparatuses, thereby avoiding a problem in the prior art that single-fiber bidirectional optical modules need to be used in matched pairs, so that a user habit does not need to be changed.

In an embodiment, the first optical transmission component and the second optical transmission component each are TO-packaged. Compared with BOX packaging in the prior art, the TO packaging technique has a complete industry chain and relatively low costs.

According to a third aspect, an embodiment of this application provides an optical module, including the optical network apparatus in the first aspect or the second aspect according to the embodiments of this application.

DESCRIPTION OF EMBODIMENTS

Figure 1:
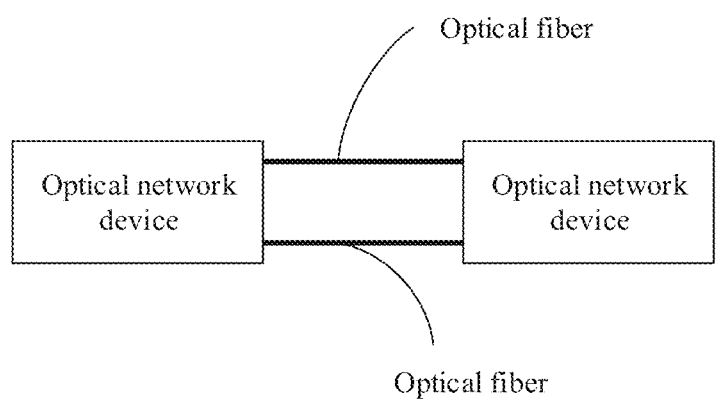
FIG. 1 is a schematic structural diagram of a communications system according to an embodiment of this application.

FIG. 1 is a schematic structural diagram of a communications system according to an embodiment of this application. As shown in FIG. 1, the communications system in this embodiment includes two optical network devices. The two optical network devices are connected to each other with optical fibers, and transmit optical signals to each other over the optical fibers. In FIG. 1, two optical fibers are used as an example, but this embodiment is not limited thereto. The optical network device includes but is not limited to the following: a switch, a router, a packet transport network (PTN) device, and a transmission device.

An optical network apparatus mentioned below may be the optical network device, or may be a component in the optical network device.

The following explains specific terms mentioned in this application.

CAUI-4 interface: A CAUI-4 interface is an optional interface used at a PMA sublayer in a 100GE interface, and mainly used for interconnection between chips or between a chip and an optical module. A rate for the interface is 4*25.78125G. For specific descriptions, refer to Annex 83E in the standard IEEE Std 802.3-2015_SECTION6, and details are not described herein.

50GAUI-2 interface: A 50GAUI-2 interface is an optional interface used at a PMA sublayer in a 50GE interface, and mainly used for interconnection between chips or between a chip and an optical module. A rate for the interface is 2*26.5625G. For specific descriptions, refer to Annex 135D in the standard IEEE P802.3Cd™/D3.1, and details are not described herein.

50GAUI-1 interface: A 50GAUI-1 interface is an optional interface used at the PMA sublayer in the 50GE interface, and mainly used for interconnection between chips or between a chip and an optical module. A rate for the interface is 1*53.125G. For specific descriptions, refer to Annex 135G in the standard IEEE P802.3Cd™/D3.1, and details are not described herein.

PMA (20:4) processing: PMA (20:4) processing converts four PCS lanes into 20 PCS lanes, or 20 PCS lanes to four PCS lanes. PMA (20:4) processing may be, for example, PMA layer processing performed according to a 100GE standard. For example, reference may be made to related descriptions of 83. Physical Medium Attachment (PMA) sublayer, type 40GBASE-R and 100GBASE-R in the standard IEEE Std 802.3-2015 SECTION6, and details are not described herein.

Figure 2:
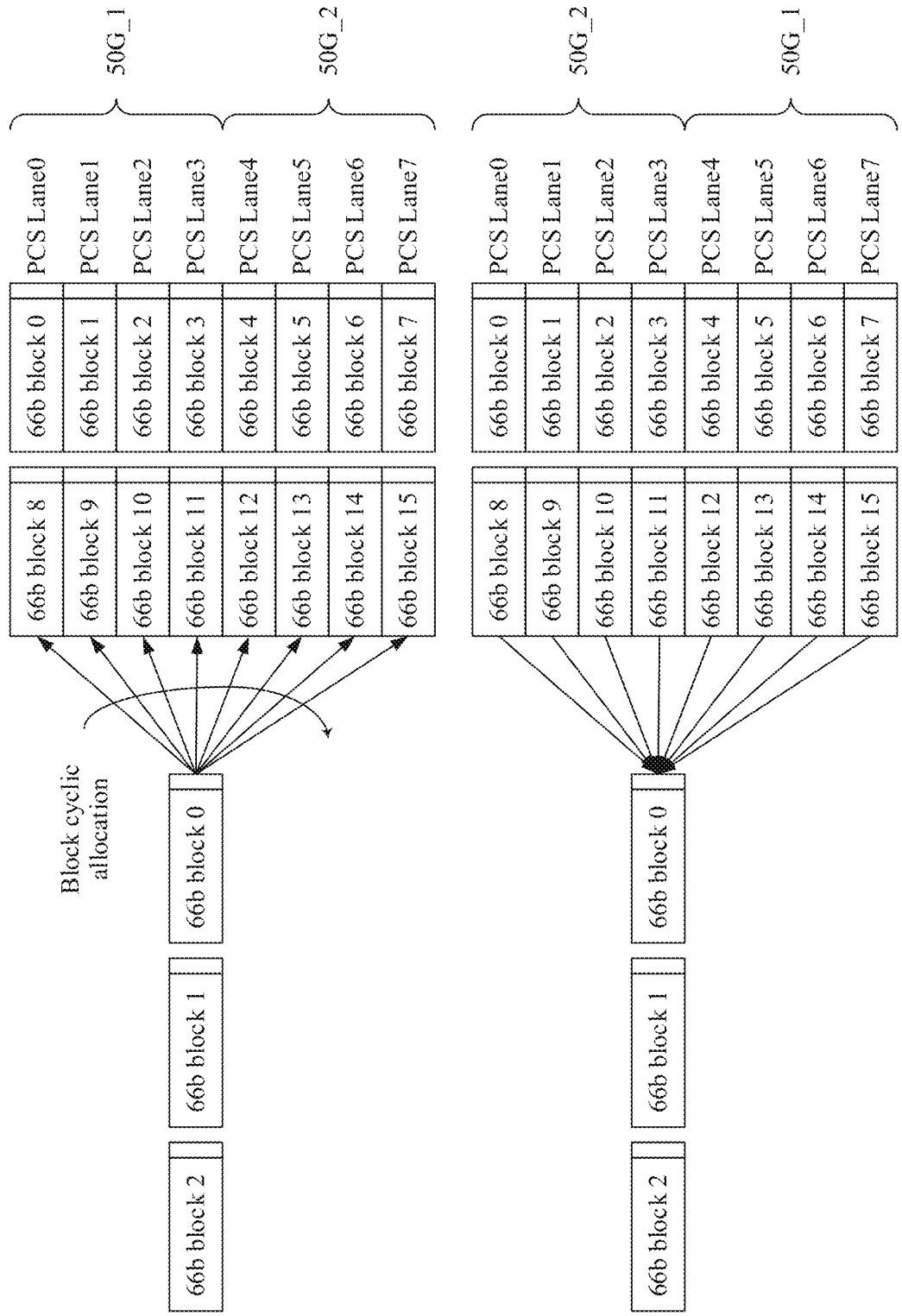
FIG. 2 is a schematic diagram of a PCS lane correspondence according to an embodiment of this application.

PCS conversion: PCS conversion refers to 100GE/2*50GE PCS conversion in this application when this application is applied to a 100G optical module. For example, in a transmit direction of a signal, first, processing is performed based on a requirement of a 100GE PCS layer, corresponding lane alignment lock processing is performed on 20 PCS lanes, alignment block removal is performed, and a bit error ratio (BER) detection function is supported. Data after the AM marker removal is a scrambled 66B block. Data of the 66B block is distributed to eight PCS lanes. A receive direction of the signal is opposite to the transmit direction of the signal, and details are not described again. As shown in FIG. 2, bandwidth of each PCS lane is 12.890625G. Lane [0:3] forms a first 50G, and Lane[4:7] forms a second 50G (The transmit direction is discussed herein, and if in the receive direction, the processing process is opposite. That is, Lane[0:3] forms the second 50G, and Lane[4:7] forms the first 50G.) For example, reference may be made to 82. Physical Coding Sublayer (PCS) for 64B/66B, type 40GBASE-R and 100GBASE-R in 802.3-2015 SECTION6; and 133. Physical Coding Sublayer (PCS) for 64B/66B, type 50GBASE-R in IEEE P802.3Cd™/D3.1.

FEC: FEC means FEC encoding in the transmit direction. Main principles are as follows: alignment synchronization, rearrangement, and AM marker removal are first performed; then FEC transcoding (for example, 66B to 257B transcoding) is performed, and a transcoded AM marker is re-inserted; and FEC encoding is performed. The FEC used herein is, for example, RS (544, 514) that is usually referred to as KP4 FEC. An error correction capability of the KP4 FEC is 2e-4, and can basically compensate for a loss caused by 4-level pulse modulation (4-Level Pulse amplitude modulation, PAM4) encoding. If an NRZ signal without the FEC and a PAM4 electrical signal with the KP4 FEC use same optoelectronic devices, transmission distances can be basically the same. Data after the FEC encoding is distributed to two FEC lanes for PMA (2:2) processing. FEC means FEC decoding in the receive direction, and the FEC decoding is opposite to the FEC encoding. For example, reference may be made to 134. Reed-Solomon Forward Error Correction (RS-FEC) sublayer for 50GBASE-R PHYs in IEEE P802.3Cd™/D3.1.

PMA (2:2) processing: PMA (2:2) processing is similar to the foregoing PMA (20:4) processing. A difference is that an input and an output herein are both two PMA lanes. In this application, the PMA (2:2) processing may be PMA (2:2) processing performed according to a 50GE standard. For example, reference may be made to 135. Physical Medium Attachment (PMA) sublayer, type 50GBASE-R and 100GBASE-P in IEEE P802.3Cd™/D3.1.

PMA (2:1) processing: In addition to converting two PMA lanes to one PMA lane or converting one PMA lane to two PMA lanes, PMA (2:1) processing further implements a PAM4 encoding function. A PAM4 signal has four levels, implementing 50 G per lane. For example, in this application, the PMA (2:1) processing may be PMA (2:1) processing performed according to the 50GE standard. For example, reference may be made to 135. Physical Medium Attachment (PMA) sublayer, type 50GBASE-R and 100GBASE-P in IEEE P802.3Cd™/D3.1.

PAM4 processing: A PAM4 signal has four levels. Compared with a 2-level NRZ signal, when a symbol flipping frequency remains unchanged, sampling information of the PAM4 signal includes 2-bit information each time, thereby doubling bandwidth. For example, reference may be made to 135. Physical Medium Attachment (PMA) sublayer, type 50GBASE-R and 100GBASE-P 135.5.7 PAM4 encoding in IEEE P802.3Cd™/D3.1.

Figure 3:
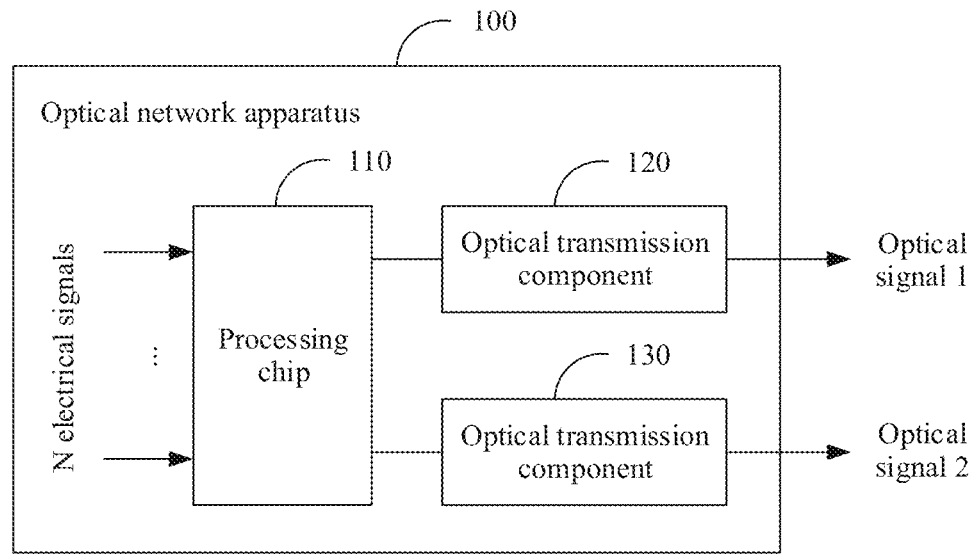
FIG. 3 is a schematic structural diagram of an optical network apparatus according to an embodiment of this application.

FIG. 3 is a schematic structural diagram of an optical network apparatus according to an embodiment of this application. As shown in FIG. 3, the optical network apparatus 100 in this embodiment is used as a first optical network apparatus. From the perspective of a transmit direction, the optical network apparatus 100 in this embodiment may include a processing chip 110, an optical transmission component 120, and an optical transmission component 130. An input end of the optical transmission component 120 is coupled to an output end of the processing chip 110, and an input end of the optical transmission component 130 is coupled to an output end of the processing chip 110.

The processing chip 110 obtains and receives N electrical signals sent by a board interface chip, where N is an integer greater than 2. The N electrical signals have same bandwidth. Then, the processing chip 110 processes the N electrical signals, and combines the received N electrical signals into two electrical signals. It should be noted that only two signals are obtained by combining the N electrical signals, the two electrical signals obtained after the combination have same bandwidth, and the two electrical signals are represented as an electrical signal 1 and an electrical signal 2. After obtaining the electrical signal 1 and the electrical signal 2, the processing chip 110 sends the electrical signal 1 to the optical transmission component 120, and sends the electrical signal 2 to the optical transmission component 130.

The optical transmission component 120 receives the electrical signal 1 sent by the processing chip 110, and converts the received electrical signal 1 into an optical signal 1. The optical transmission component 130 receives the electrical signal 2 sent by the processing chip 110, and converts the received electrical signal 2 into an optical signal 2.

The optical transmission component 120 is connected to one optical fiber (for example, an optical fiber 1), and the optical transmission component 130 is connected to another optical fiber (for example, an optical fiber 2). For example, the other end of each of the optical fiber 1 and the optical fiber 2 may be connected to another optical network apparatus (for example, the one shown in FIG. 4). The optical transmission component 120 sends an optical signal over the optical fiber 1, and the optical transmission component 130 sends an optical signal over the optical fiber 2.

According to the optical network apparatus in this embodiment, the processing chip first combines the N electrical signals into fewer electrical signals, that is, the two electrical signals, then one optical transmission component converts one electrical signal into one optical signal, and the other optical transmission component converts the other electrical signal into the other optical signal. The N to-be-sent electrical signals obtained by the processing chip are combined, and only two optical transmission components are connected to the processing chip. Therefore, the processing chip does not need to be connected to N optical transmission components, fewer optical transmission components are required, and costs are reduced.

Figure 4:
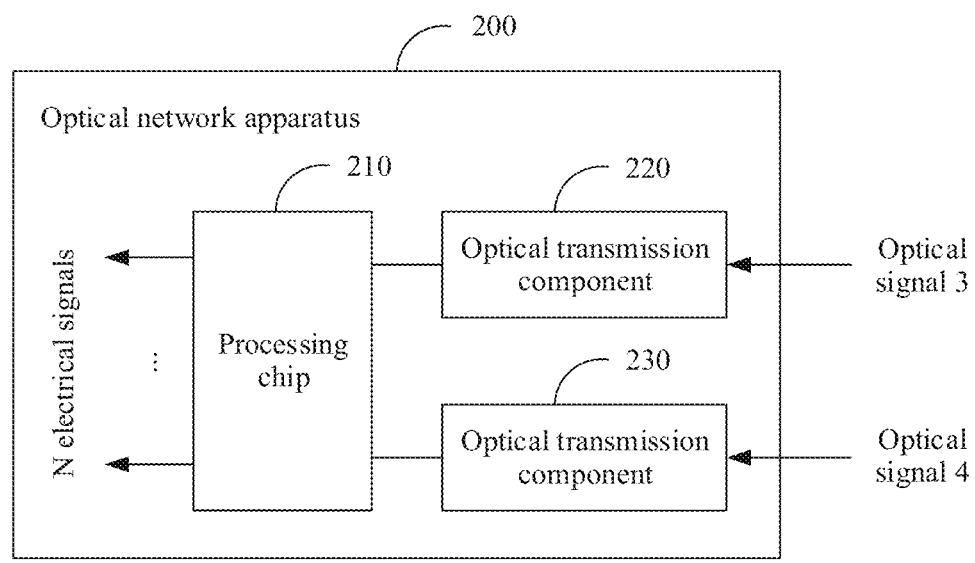
FIG. 4 is a schematic structural diagram of an optical network apparatus according to another embodiment of this application.

FIG. 4 is a schematic structural diagram of an optical network apparatus according to another embodiment of this application. As shown in FIG. 4, the optical network apparatus 200 in this embodiment is used as a second optical network apparatus. From the perspective of a receive direction, the optical network apparatus 200 in this embodiment may include a processing chip 210, an optical transmission component 220, and an optical transmission component 230. An output end of the optical transmission component 220 is coupled to an input end of the processing chip 210, and an output end of the optical transmission component 230 is coupled to an input end of the processing chip 210.

The optical transmission component 220 receives an optical signal 3, converts the received optical signal 3 into an electrical signal 3, and then sends the electrical signal 3 to the processing chip 210. The optical transmission component 230 receives an optical signal 4, converts the received optical signal 4 into an electrical signal 4, and then sends the electrical signal 4 to the processing chip 210. Bandwidth of the electrical signal 3 is the same as bandwidth of the electrical signal 4. The optical transmission component 220 may be connected to one optical fiber (for example, an optical fiber 1), and the optical transmission component 220 may be connected to another optical fiber (for example, an optical fiber 2). For example, the other end of each of the optical fiber 1 and the optical fiber 2 may be connected to another optical network apparatus (for example, the one shown in FIG. 3). The optical transmission component 220 receives the optical signal 3 over the optical fiber 1, and the optical transmission component 230 receives the optical signal 4 over the optical fiber 2.

The processing chip 210 processes the electrical signal 3 and the electrical signal 4 (namely, two electrical signals), to obtain N electrical signals, where N is an integer greater than 2, and the N electrical signals have same bandwidth. Then, the processing chip 210 sends the obtained N electrical signals to a board interface chip.

According to the optical network apparatus in this embodiment, one optical transmission component receives one optical signal and converts the optical signal into one electrical signal, the other optical transmission component receives the other optical signal and converts the optical signal into the other electrical signal, then the processing chip processes the two electrical signals, to obtain more electrical signals, that is, the N electrical signals, and outputs the N electrical signals. The N electrical signals output by the processing chip are obtained by processing the two electrical signals, and a quantity of optical transmission components connected to the processing chip is less than N. Therefore, the processing chip does not need to be connected to N optical transmission components, fewer optical transmission components are required, and costs are reduced.

Figure 5:
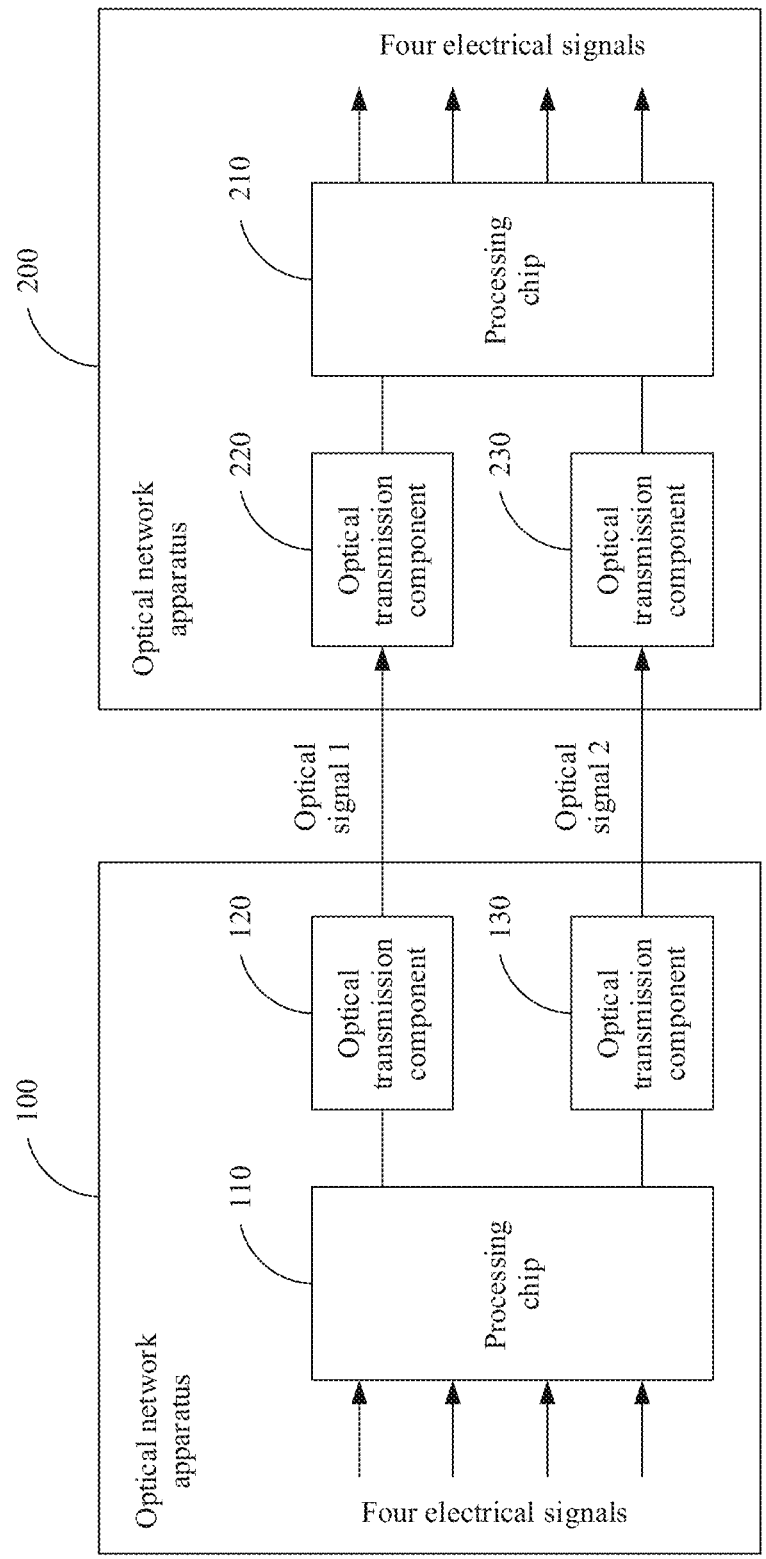
FIG. 5 is a schematic structural diagram of a communications system according to an embodiment of this application.

FIG. 5 is a schematic structural diagram of a communications system according to an embodiment of this application. As shown in FIG. 5, the communications system in this embodiment may include an optical network apparatus 100 and an optical network apparatus 200. The optical network apparatus 100 may use the structure shown in FIG. 3, implementation principles are similar, and details are not described herein again. The optical network apparatus 200 may use the structure shown in FIG. 4, implementation principles are similar, and details are not described herein again. The optical network apparatus 100 may be connected to the optical network apparatus 200 with optical fibers for communication. For example, the optical network apparatus 100 sends two optical signals to the optical network apparatus 200. In some embodiments, an optical signal 1 may alternatively be an optical signal 3, an optical signal 2 may be an optical signal 4, an electrical signal 1 may be an electrical signal 3, and an electrical signal 2 may be an electrical signal 4.

In some embodiments, N is equal to 4. To be specific, a processing chip 110 in the optical network apparatus 100 converts four electrical signals received from a board interface chip into two electrical signals (the electrical signal 1 and the electrical signal 2), then sends the electrical signal 1 to an optical transmission component 120, and sends the electrical signal 2 to an optical transmission component 130. The optical transmission component 120 converts the electrical signal 1 into the optical signal 1, and sends the optical signal 1 to the optical network apparatus 200 over an optical fiber 1. The optical transmission component 130 converts the electrical signal 2 into the optical signal 2, and sends the optical signal 2 to the optical network apparatus 200 over an optical fiber 2. An optical transmission component 220 in the optical network apparatus 200 is connected to the optical transmission component 120 in the optical network apparatus 100 through an optical fiber, and an optical transmission component 230 in the optical network apparatus 200 is connected to the optical transmission component 130 in the optical network apparatus 100 through an optical fiber.

Therefore, the optical transmission component 220 in the optical network apparatus 200 may receive the optical signal 1, convert the optical signal 1 into the electrical signal 1, and then send the electrical signal 1 to a processing chip 210. The optical transmission component 230 may receive the optical signal 2, convert the optical signal 2 into the electrical signal 2, and then send the electrical signal 2 to the processing chip 210. The processing chip 210 receives the electrical signal 1 from the optical transmission component 220 and the electrical signal 2 from the optical transmission component 230, that is, receives two electrical signals in total, then processes the two electrical signals (the electrical signal 1 and the electrical signal 2), to obtain four electrical signals, and sends the four electrical signals to the board interface chip.

Compared with the prior art in which the processing chip needs to be connected to four optical transmission components to obtain the four electrical signals, in this embodiment, the processing chip needs to be connected to only two optical transmission components to obtain the four electrical signals. Therefore, fewer optical transmission components are required, and costs are reduced.

Figure 6:
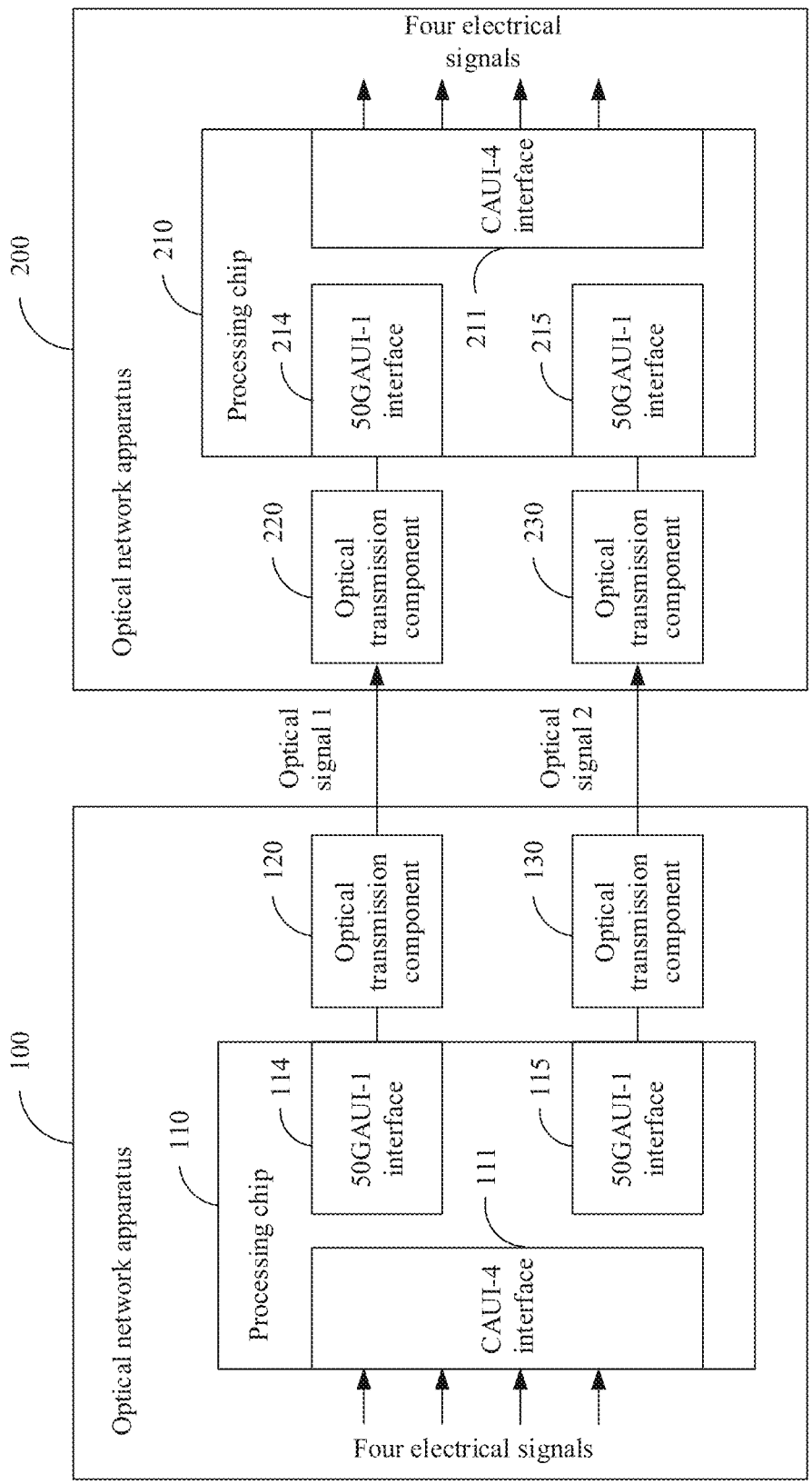
FIG. 6 is a schematic structural diagram of a communications system according to another embodiment of this application.

A person skilled in the art may understand that this application may be applied to a 100GE optical module, or may be applied to an optical module including but not limited to a 200GE optical module or a 400GE optical module. For example, when this application is applied to the 200GE optical module, the solution in this application may include two cases: being used as a single 200GE optical module, or being used as two separate 100GE optical modules. A processing manner of the 200GE optical module is similar to the following solution. A difference is that the processing chip needs to support both 100GE and 200GE interfaces when applied to the 200GE optical module. The following further describes this embodiment of this application by using the 100GE optical module as an example. That the processing chip receives the four electrical signals sent by the board interface chip, includes at least two cases:

First case: applied to 1*100GE. As shown in FIG. 6, the processing chip 110 includes a CAUI-4 interface 111. When the board interface chip is a 100G board interface chip, the processing chip 110 is connected to the board interface chip through the CAUI-4 interface 111. The processing chip 210 includes a CAUI-4 interface 211. When the board interface chip is the 100G board interface chip, the processing chip 210 is connected to the board interface chip through the CAUI-4 interface 211.

The processing chip 110 receives, over the CAUI-4 interface 111, four electrical signals (namely, an electrical signal A1 to an electrical signal A4) sent by the board interface chip. Correspondingly, the processing chip 210 may output the four electrical signals (namely, the electrical signal A1 to the electrical signal A4) to the board interface chip through the CAUI-4 interface 211.

For example, bandwidth of each of the four electrical signals may be 25.78125G, and bandwidth of each of the foregoing electrical signal 1 and electrical signal 2 may be 53.125G.

Figure 7:
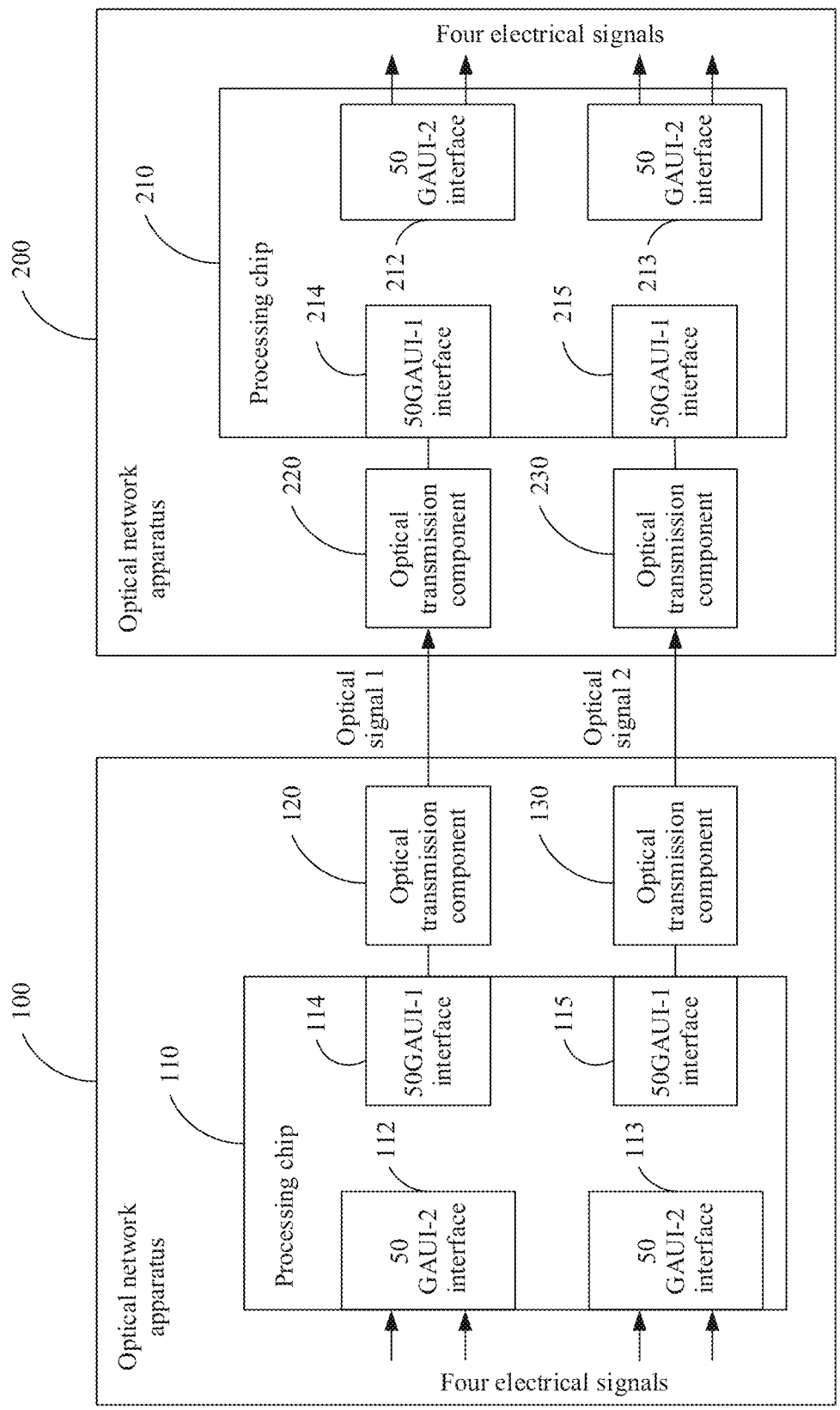
FIG. 7 is a schematic structural diagram of a communications system according to another embodiment of this application.

Second case: applied to 2*50GE. As shown in FIG. 7, the processing chip 110 includes two 50GAUI-2 interfaces that are represented as a 50GAUI-2 interface 112 and a 50GAUI-2 interface 113. When the board interface chip is a 50G board interface chip, the processing chip 110 is connected to the 50G board interface chip through the 50GAUI-2 interface 112 and the 50GAUI-2 interface 113. Correspondingly, the processing chip 210 includes two 50GAUI-2 interfaces that are represented as a 50GAUI-2 interface 212 and a 50GAUI-2 interface 213. When the board interface chip is the 50G board interface chip, the processing chip 210 is connected to the 50G board interface chip through the 50GAUI-2 interface 212 and the 50GAUI-2 interface 213.

Each 50GAUI-2 interface may transmit two electrical signals. Therefore, the processing chip 110 may receive, over the 50GAUI-2 interface 112, two electrical signals (namely, an electrical signal A1 and an electrical signal A2) sent by the board interface chip, and may receive, over the 50GAUI-2 interface 113, the other two electrical signals (namely, an electrical signal A3 and an electrical signal A4) sent by the board interface chip. The processing chip 210 may send the two electrical signals (namely, the electrical signal A1 and the electrical signal A2) to the board interface chip over the 50GAUI-2 interface 212, and may receive, over the 50GAUI-2 interface 213, the other two electrical signals (namely, the electrical signal A3 and the electrical signal A4) sent by the board interface chip.

For example, bandwidth of each of the four electrical signals may be 26.5625G, and bandwidth of each of the foregoing electrical signal 1 and electrical signal 2 may be 53.125G.

In some embodiments, the processing chip 110 may further include two 50GAUI-1 interfaces that are represented as a 50GAUI-1 interface 114 and a 50GAUI-1 interface 115. The processing chip 110 is connected to the optical transmission component 120 through the 50GAUI-1 interface 114, and the processing chip 110 is connected to the optical transmission component 130 through the 50GAUI-1 interface 115. Correspondingly, the processing chip 210 may further include two 50GAUI-1 interfaces that are represented as a 50GAUI-1 interface 214 and a 50GAUI-1 interface 215. The processing chip 210 is connected to the optical transmission component 220 through the 50GAUI-1 interface 214, and the processing chip 210 is connected to the optical transmission component 230 through the 50GAUI-1 interface 215. Each 50GAUI-1 interface is configured to transmit one electrical signal.

In the foregoing first case, after the processing chip 110 receives, through the CAUI-4 interface 111, the four electrical signals (the electrical signal A1 to the electrical signal A4) output by the board interface chip (for example, after PMA (20:4) processing), an implementation in which the processing chip 110 combines the electrical signal A1 to the electrical signal A4 into the electrical signal 1 and the electrical signal 2 may be as follows:

The processing chip 110 further includes a first circuit, a second circuit, and a third circuit. The first circuit performs PMA processing and PCS conversion processing on the electrical signal A1 to the electrical signal A4, to obtain eight processed electrical signals, where the eight processed electrical signals are represented as an electrical signal B1 to an electrical signal B8. The second circuit performs FEC encoding and PMA (2:2) processing on the electrical signal B1 to an electrical signal B4, to obtain a processed electrical signal C1 and a processed electrical signal C2. For example, the second circuit performs the FEC encoding on the electrical signal B1 to the electrical signal B4, to obtain an electrical signal E1 and an electrical signal E2, then performs the PMA (2:2) processing on the electrical signal E1 and the electrical signal E2, to obtain the electrical signal C1 and the electrical signal C2. The second circuit performs the FEC encoding and the PMA (2:2) processing on an electrical signal B5 to the electrical signal B8, to obtain a processed electrical signal C3 and a processed electrical signal C4. For example, the second circuit performs the FEC encoding on the electrical signal B5 to the electrical signal B8, to obtain an electrical signal E3 and an electrical signal E4, then performs the PMA (2:2) processing on the electrical signal E3 and the electrical signal E4, to obtain the electrical signal C3 and the electrical signal C4. The third circuit performs PMA (2:1) processing on the electrical signal C1 and the electrical signal C2, to obtain the processed electrical signal 1, and performs the PMA (2:1) processing on the electrical signal C3 and the electrical signal C4, to obtain the processed electrical signal 2.

That the first circuit performs PMA processing and PCS conversion processing on the electrical signal A1 to the electrical signal A4, to obtain the electrical signal B1 to the electrical signal B8 includes: performing, by the first circuit, PMA (20:4) processing on the electrical signal A1 to the electrical signal A4, to obtain 20 processed electrical signals, where the 20 processed electrical signals are represented as an electrical signal D1 to an electrical signal D20; and performing the PCS conversion processing on the electrical signal D1 to the electrical signal D20, to obtain the electrical signal B1 to the electrical signal B8. Alternatively, the first circuit first performs PMA (16:4) processing on the electrical signal A1 to the electrical signal A4, to obtain 16 processed electrical signals, where the 16 processed electrical signals are represented as an electrical signal D1 to an electrical signal D16; and performs the PCS conversion processing on the electrical signal D1 to the electrical signal D16, to obtain the electrical signal B1 to the electrical signal B8.

Therefore, the processing chip 110 combines the four electrical signals into the two electrical signals.

Correspondingly, in the foregoing first case, after the processing chip 210 receives the electrical signal 1 sent by the optical transmission component 220 and the electrical signal 2 sent by the optical transmission component 230, an implementation in which the processing chip 210 processes the electrical signal 1 and the electrical signal 2, to obtain the four electrical signals may be as follows:

The processing chip 210 further includes a first circuit, a second circuit, and a third circuit. The third circuit performs the PMA (2:1) processing on the electrical signal 1, to obtain two electrical signals that are represented as the electrical signal C1 and the electrical signal C2; and performs the PMA (2:1) processing on the electrical signal 2, to obtain two electrical signals that are represented as the electrical signal C3 and the electrical signal C4. The second circuit performs the PMA (2:2) processing and FEC decoding on the electrical signal C1 and the electrical signal C2, to obtain four electrical signals that are represented as the electrical signal B1 to the electrical signal B4. For example, the second circuit performs the PMA (2:2) processing on the electrical signal C1 and the electrical signal C2, to obtain the electrical signal E1 and the electrical signal E2, then performs the FEC decoding on the electrical signal E1 and the electrical signal E2, to obtain the electrical signal B1 to the electrical signal B4. The second circuit performs the PMA (2:2) processing and the FEC decoding on the electrical signals C3 and C4, to obtain four electrical signals that are represented as the electrical signal B5 to the electrical signal B8. For example, the second circuit performs the PMA (2:2) processing on the electrical signal C3 and the electrical signal C4, to obtain the electrical signal E3 and the electrical signal E4, then performs the FEC decoding on the electrical signal E3 and the electrical signal E4, to obtain the electrical signal B5 to the electrical signal B8. The first circuit performs the PCS conversion processing and the PMA processing on the electrical signal B1 to the electrical signal B8, to obtain four electrical signals that are represented as the electrical signal A1 to the electrical signal A4.

That the first circuit is configured to: perform the PCS conversion processing and the PMA processing on the electrical signal B1 to the electrical signal B8, to obtain the electrical signal A1 to the electrical signal A4 includes: performing, by the first circuit, the PCS conversion processing on the electrical signal B1 to the electrical signal B8, to obtain 20 processed electrical signals, where the 20 processed electrical signals are represented as the electrical signal D1 to the electrical signal D20; and performing the PMA (20:4) processing on the electrical signal D1 to the electrical signal D20, to obtain the electrical signal A1 to the electrical signal A4. Alternatively, the first circuit performs the PCS conversion processing on the electrical signal B1 to the electrical signal B8, to obtain 16 processed electrical signals, where the 16 processed electrical signals are represented as the electrical signal D1 to the electrical signal D16; and performs the PMA (16:4) processing on the electrical signal D1 to the electrical signal D16, to obtain the electrical signal A1 to the electrical signal A4.

Therefore, the processing chip 210 obtains the four electrical signals based on the two electrical signals.

Figure 8:
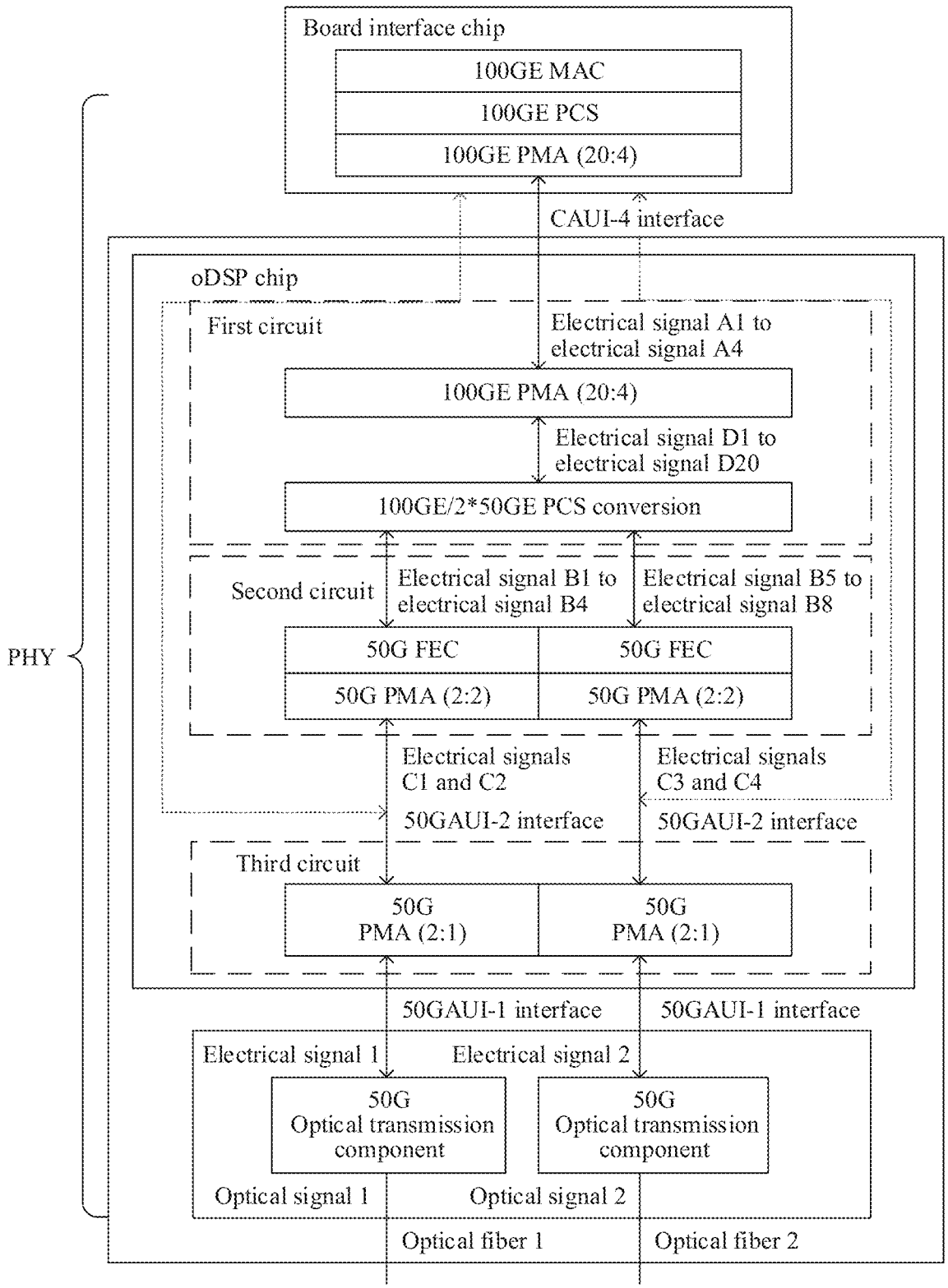
FIG. 8 is a schematic diagram of processing of an optical network apparatus applied to 1*100GE according to an embodiment of this application.

The following describes processing processes of the foregoing processing chip 110 and the foregoing processing chip 210 by using a specific example. FIG. 8 shows an example in which a processing chip is an oDSP chip.

If the board interface chip is the 100G board interface chip, the first circuit, the second circuit, and the third circuit in the processing chip 110 all work. The board interface chip sends, to the processing chip 110 through the CAUI-4 interface 111, the four electrical signals, namely, the electrical signal A1 to the electrical signal A4, obtained after 100GE PMA (20:4) processing, and the first circuit of the processing chip 110 performs the 100GE PMA (20:4) processing on the electrical signal A1 to the electrical signal A4, to obtain 20 electrical signals (represented as the electrical signal D1 to the electrical signal D20). The first circuit then performs 100GE/2*50GE PCS conversion on the electrical signal D1 to the electrical signal D20, to obtain eight electrical signals that are represented as the electrical signal B1 to the electrical signal B8. The second circuit then performs 50G FEC encoding and then performs 50GE PMA (2:2) on the electrical signal B1 to the electrical signal B4, to obtain the two electrical signals that are represented as the electrical signal C1 and the electrical signal C2; and performs the 50G FEC encoding and then performs 50GE PMA (2:2) on the electrical signal B5 to the electrical signal B8, to obtain the two electrical signals that are represented as the electrical signal C3 and the electrical signal C4. The third circuit performs the 50GE PMA (2:1) processing on the electrical signal C1 and the electrical signal C2, to obtain the electrical signal 1, and performs the 50GE PMA (2:1) processing on the electrical signal C3 and the electrical signal C4, to obtain the electrical signal 2. The processing chip 110 sends the electrical signal 1 to the optical transmission component 120 over the 50GAUI-1 interface 114, and the processing chip 110 sends the electrical signal 2 to the optical transmission component 130 over the 50GAUI-1 interface 115. The optical transmission component 120 converts the electrical signal 1 into the optical signal 1, and then sends the optical signal 1 to the optical network apparatus 200 over the optical fiber 1. The optical transmission component 130 converts the electrical signal 2 into the optical signal 2, and then sends the optical signal 2 to the optical network apparatus 200 over the optical fiber 2.

Correspondingly, if the board interface chip is the 100G board interface chip, the first circuit, the second circuit, and the third circuit in the processing chip 210 all work. The optical transmission component 220 in the optical network apparatus 200 receives the optical signal 1 over the optical fiber 1, converts the optical signal 1 into the electrical signal 1, and then sends the electrical signal 1 to the processing chip 210 over the 50GAUI-1 interface 214. The optical transmission component 230 receives the optical signal 2 over the optical fiber 2, converts the optical signal 2 into the electrical signal 2, and then sends the electrical signal 2 to the processing chip 210 over the 50GAUI-1 interface 215. The third circuit of the processing chip 210 performs the 50GE PMA (2:1) processing on the electrical signal 1, to obtain two electrical signals that are represented as the electrical signal C1 and the electrical signal C2; and performs the 50GE PMA (2:1) processing on the electrical signal 2, to obtain two electrical signals that are represented as the electrical signal C3 and the electrical signal C4. That is, the processing chip 210 can obtain four electrical signals in total. The second circuit performs 50GE PMA (2:2) processing and then performs 50G FEC decoding on the electrical signal C1 and the electrical signal C2, to obtain the four electrical signals that are represented as the electrical signal B1 to the electrical signal B4; and performs the 50GE PMA (2:2) processing and then performs the 50G FEC decoding on the electrical signal C3 and the electrical signal C4, to obtain the four electrical signals that are represented as the electrical signal B5 to the electrical signal B8. The first circuit performs the 100GE/2*50GE PCS conversion on the obtained electrical signal B1 to electrical signal B8, to obtain 20 electrical signals that are represented as the electrical signal D1 to the electrical signal D20; and then performs the 100GE PMA (20:4) processing on the electrical signal D1 to the electrical signal D20, to obtain the four electrical signals that are represented as the electrical signal A1 to the electrical signal A4. The processing chip 210 then sends the electrical signal A1 to the electrical signal A4 to the board interface chip through the CAUI-4 interface 211.

In the foregoing second case, after the processing chip 110 receives, over the 50GAUI-2 interface 113, the two electrical signals (the electrical signal A1 and the electrical signal A2) sent by the board interface chip (for example, after 50GE PMA (2:1) processing), and receives, over the 50GAUI-2 interface 114, the two electrical signals (the electrical signal A3 and the electrical signal A4) sent by the board interface chip (for example, after the 50GE PMA (2:1) processing), an implementation in which the processing chip 110 combines the received electrical signal A1 to electrical signal A4 into the electrical signal 1 and the electrical signal 2 may be as follows:

The processing chip 110 further includes a third circuit. The third circuit performs the PMA (2:1) processing on the electrical signal A1 and the electrical signal A2, to obtain the processed electrical signal 1; and performs the PMA (2:1) processing on the electrical signal A3 and the electrical signal A4, to obtain the processed electrical signal 2.

Therefore, the processing chip 110 combines the four electrical signals into the two electrical signals.

Correspondingly, in the foregoing second case, after the processing chip 210 receives the electrical signal 1 sent by the optical transmission component 220 and the electrical signal 2 sent by the optical transmission component 230, an implementation in which the processing chip 210 processes the electrical signal 1 and the electrical signal 2, to obtain the four electrical signals may be as follows:

The processing chip 210 further includes a third circuit. The third circuit performs the PMA (2:1) processing on the electrical signal 1, to obtain the electrical signal A1 and the electrical signal A2; and performs the PMA (2:1) processing on the electrical signal 2, to obtain the electrical signal A3 and the electrical signal A4.

Therefore, the processing chip 210 obtains the four electrical signals based on the two electrical signals.

Figure 9:
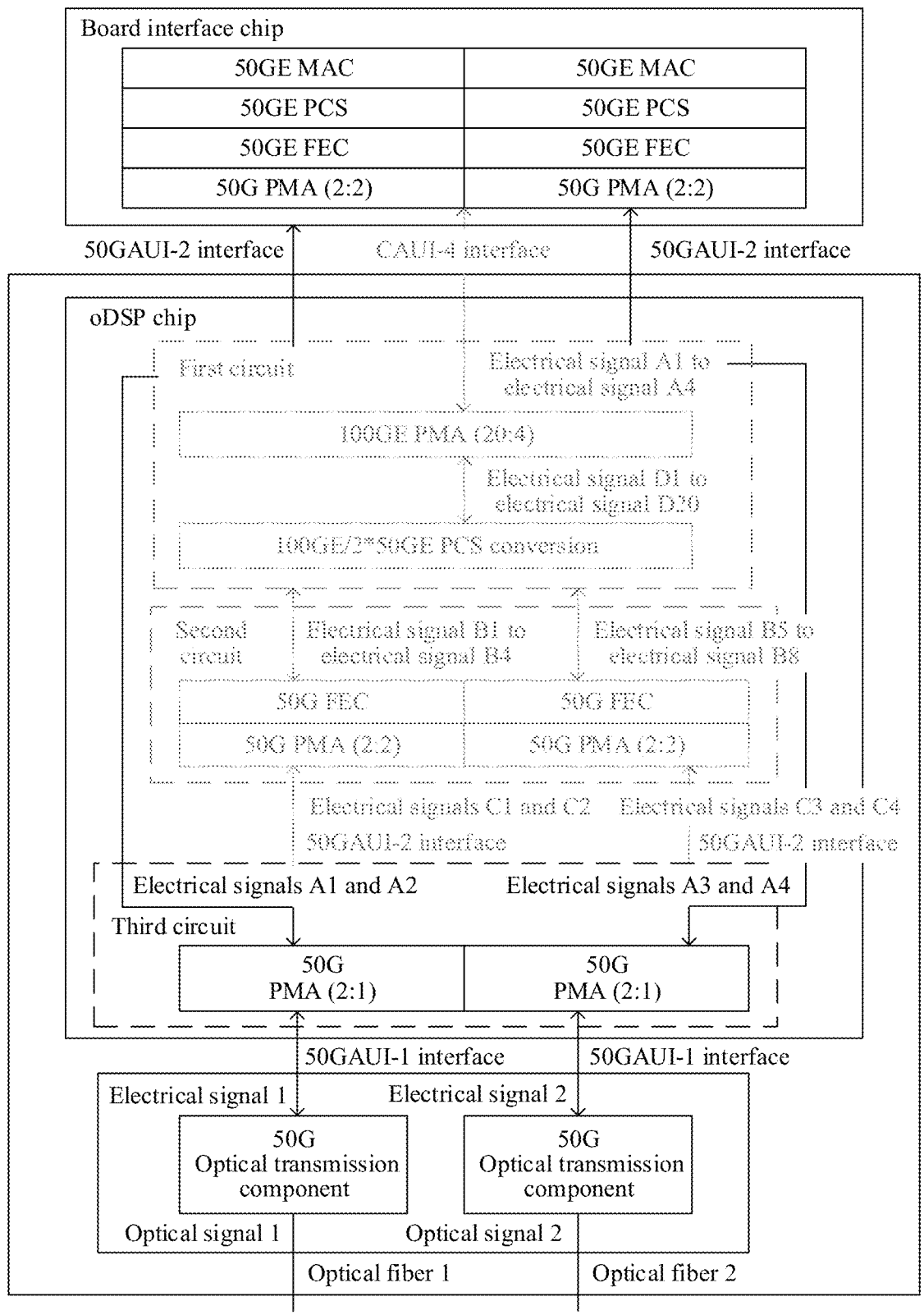
FIG. 9 is a schematic diagram of processing of an optical network apparatus applied to 2*50GE according to an embodiment of this application.

The following describes processing processes of the foregoing processing chip 110 and the foregoing processing chip 210 by using a specific example in FIG. 9. If the board interface chip is the 50G board interface chip, the third circuit in the processing chip 110 works. The board interface chip sends, to the processing chip 110 over the 50GAUI-2 interface 112, the electrical signal A1 and the electrical signal A2 that are obtained after the 50GE PMA (2:1) processing is performed, and sends, to the processing chip 110 over the 50GAUI-2 interface 113, the electrical signal A3 and the electrical signal A4 that are obtained after the 50GE PMA (2:1) processing is performed. The processing chip 110 performs the 50GE PMA (2:1) processing on the electrical signal A1 and the electrical signal A2, to obtain the electrical signal 1, and performs the 50GE PMA (2:1) processing on the electrical signal A3 and the electrical signal A4, to obtain the electrical signal 2. That is, the processing chip 110 obtains two electrical signals in total. The processing chip 110 sends the electrical signal 1 to the optical transmission component 120 over the 50GAUI-1 interface 114, and sends the electrical signal 2 to the optical transmission component 130 over the 50GAUI-1 interface 115. The optical transmission component 120 converts the electrical signal 1 into the optical signal 1, and then sends the optical signal 1 to the optical network apparatus 200 over the optical fiber 1. The optical transmission component 130 converts the electrical signal 2 into the optical signal 2, and then sends the optical signal 2 to the optical network apparatus 200 over the optical fiber 2.

Correspondingly, if the board interface chip is the 50G board interface chip, the third circuit in the processing chip 210 works. The optical transmission component 220 in the optical network apparatus 200 receives the optical signal 1 over the optical fiber 1, converts the optical signal 1 into the electrical signal 1, and then sends the electrical signal 1 to the processing chip 210 over the 50GAUI-1 interface 214. The optical transmission component 230 receives the optical signal 2 over the optical fiber 2, converts the optical signal 2 into the electrical signal 2, and then sends the electrical signal 2 to the processing chip 210 over the 50GAUI-1 interface 215. The third circuit of the processing chip 210 performs the 50GE PMA (2:1) processing on the electrical signal 1, to obtain the two electrical signals that are represented as the electrical signal A1 and the electrical signal A2, and performs the 50GE PMA (2:1) processing on the electrical signal 2, to obtain the two electrical signals that are represented as the electrical signal A3 and the electrical signal A4. The processing chip 210 then sends the electrical signal A1 and the electrical signal A2 to the single-interface chip over the 50GAUI-2 interface 214, and sends the electrical signal A3 and the electrical signal A4 to the single-interface chip over the 50GAUI-2 interface 215.

The PMA (2:1) processing mentioned in the foregoing embodiments includes PAM4 processing. The PAM4 processing may double effective bandwidth without increasing a symbol frequency of a signal.

Figure 10:
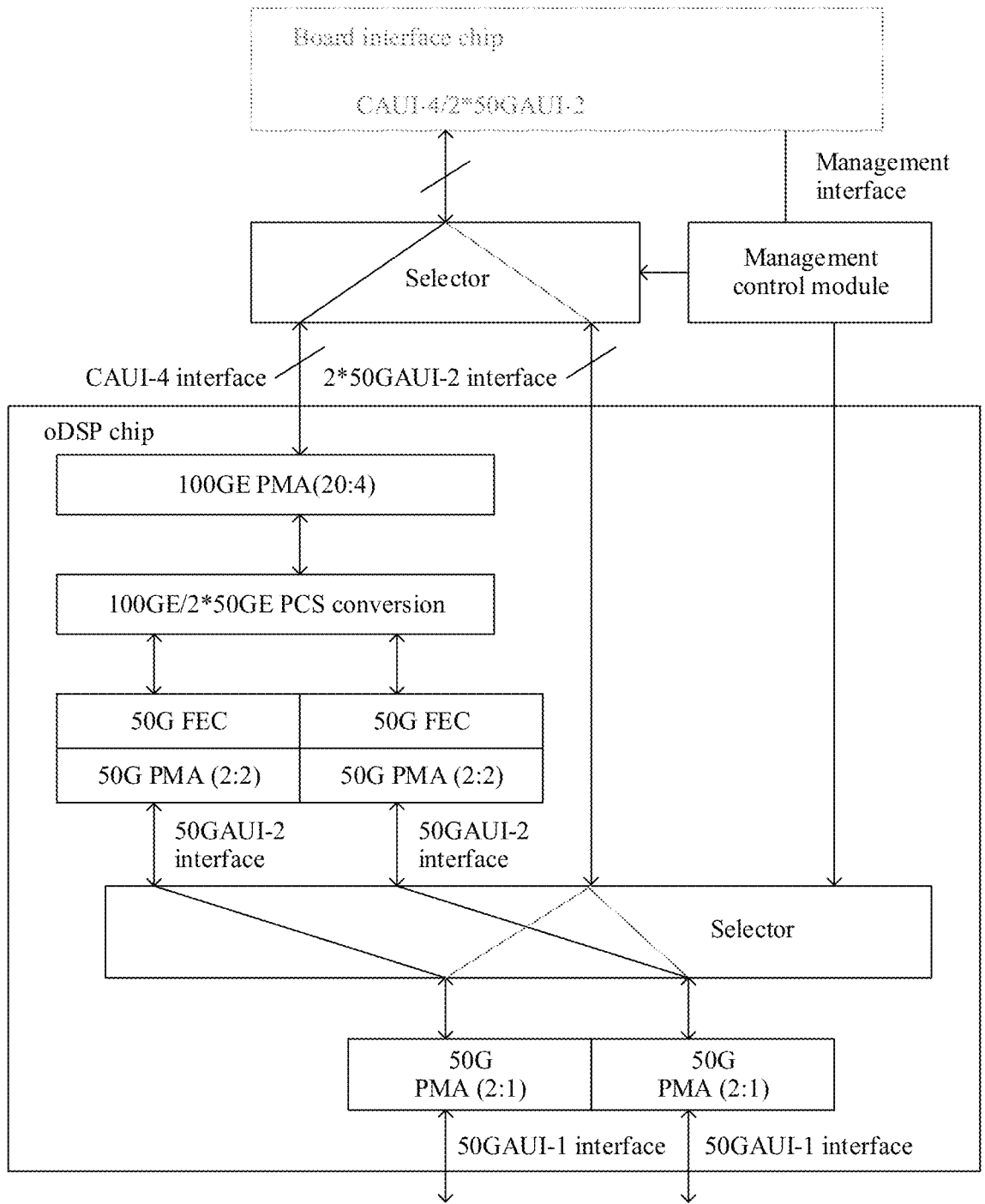
FIG. 10 is a schematic diagram of switching between two modes by a processing chip according to an embodiment of this application.

In some embodiments, the foregoing processing chip may include the CAUI-4 interface (which indicates that the processing chip works in a 1*100GE mode) and the 2*50GAUI-2 interfaces (which indicate that the processing chip works in a 2*50GE mode). During power-on initialization, a management control module of the processing chip learns of a working mode through a management interface. After learning of the working mode, the management control module controls two selectors by using a management control signal. As shown in FIG. 10, when learning, through the management interface, that the working mode is the 1*100GE mode, the management control module controls a selector in an upper part of the figure to select the CAUI-4 interface between the board interface chip and the oDSP chip to work, and controls a selector in a lower part of the figure to select an output of the PMA (2:2) processing as an input of the PMA (2:1) processing. When learning, through the management interface, that the working mode is the 2*50GE mode, the management control module controls the selector in the upper part of the figure to select the 50GAUI-2 interfaces between the board interface chip and the oDSP chip to work, and controls the selector in the lower part of the figure to select electrical signals received by the oDSP chip over the 50GAUI-2 interfaces as an input of the PMA (2:1) processing.

The following describes a structure of an optical transmission component.

Figure 11A:
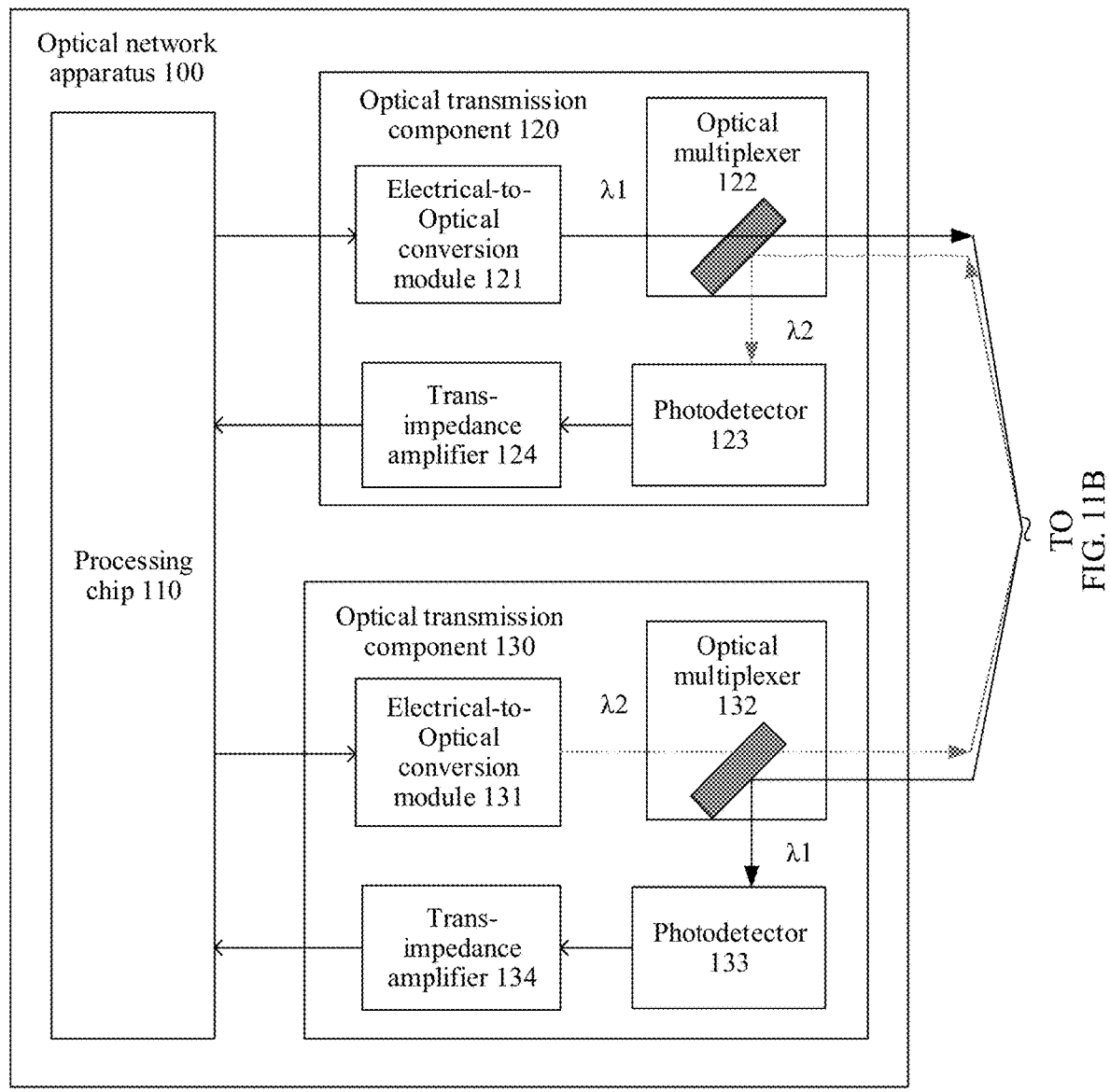
FIG. 11A and FIG. 11B are a schematic structural diagram of a communications system according to another embodiment of this application.
Figure 11B:
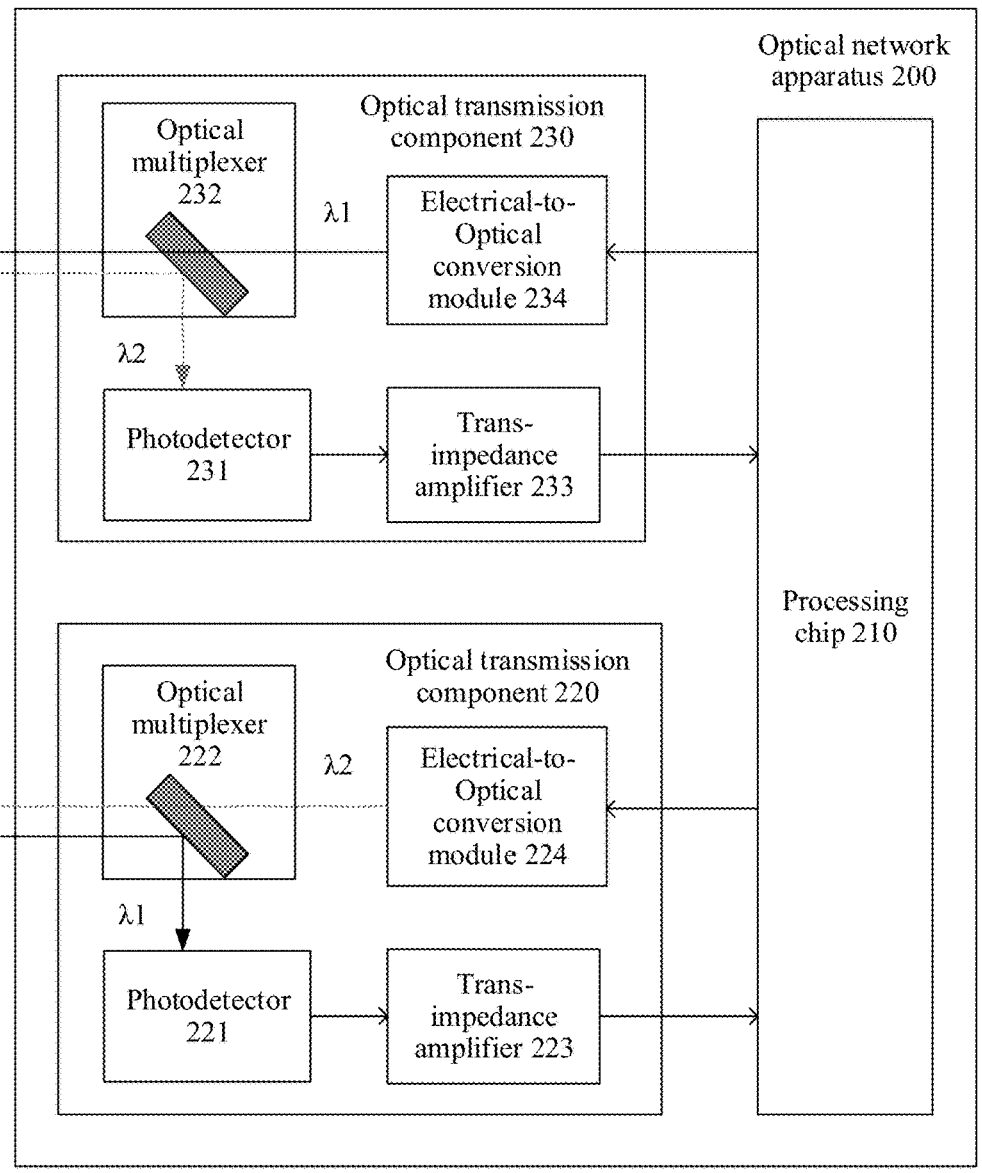

FIG. 11A and FIG. 11B are a schematic structural diagram of a communications system according to another embodiment of this application. As shown in FIG. 11A and FIG. 11B, the communications system in this embodiment is based on the foregoing embodiments. An optical transmission component 120 in this embodiment may include an electrical-to-optical conversion module 121 and an optical multiplexer 122 connected to the electrical-to-optical conversion module 121. The electrical-to-optical conversion module 121 converts an electrical signal 1 into an optical signal 1, and the optical multiplexer 122 sends the optical signal 1 to an optical network apparatus 200. An optical transmission component 130 in this embodiment may include an electrical-to-optical conversion module 131 and an optical multiplexer 132 connected to the electrical-to-optical conversion module 131. The electrical-to-optical conversion module 131 converts an electrical signal 2 into an optical signal 2, and the optical multiplexer 132 sends the optical signal 2 to the optical network apparatus 200. Optionally, the electrical-to-optical conversion module may include a laser.

Correspondingly, an optical transmission component 220 in this embodiment may include a photodetector 221 and an optical multiplexer 222 connected to the photodetector 221. The optical multiplexer 222 receives the optical signal 1, and sends the optical signal 1 to the photodetector 221. The photodetector 221 converts the optical signal 1 into the electrical signal 1, and sends the electrical signal 1 to a processing chip 210. The optical transmission component 230 in this embodiment may include a photodetector 231 and an optical multiplexer 232 connected to the photodetector 231. The optical multiplexer 232 receives the optical signal 2, and sends the optical signal 2 to the photodetector 231. The photodetector 231 converts the optical signal 2 into the electrical signal 2, and sends the electrical signal 2 to the processing chip 210.

In an embodiment, the optical transmission component 220 may further include a trans-impedance amplifier 223, and the trans-impedance amplifier 223 is connected to the photodetector 221. The photodetector 221 outputs, to the trans-impedance amplifier 223, the electrical signal 1 obtained through conversion. The trans-impedance amplifier 223 amplifies the electrical signal 1, and then sends the amplified electrical signal 1 to the processing chip 210. The optical transmission component 230 may further include a trans-impedance amplifier 233, and the trans-impedance amplifier 233 is connected to the photodetector 231. The photodetector 231 outputs, to the trans-impedance amplifier 233, the electrical signal 2 obtained through conversion. The trans-impedance amplifier 233 amplifies the electrical signal 2, and then sends the amplified electrical signal 2 to the processing chip 210.

In an embodiment, the optical transmission component 220 further includes an electrical-to-optical conversion module 224 connected to the optical multiplexer 222, and the optical transmission component 230 further includes an electrical-to-optical conversion module 234 connected to the optical multiplexer 232. The processing chip 210 is further configured to: receive N electrical signals sent by a board interface chip, process the N electrical signals to convert the received N electrical signals into two electrical signals, where the two electrical signals are represented as an electrical signal 5 and an electrical signal 6. The electrical-to-optical conversion module 224 is configured to convert the electrical signal 5 into an optical signal 5. The optical multiplexer 222 is further configured to send the optical signal 5. The electrical-to-optical conversion module 234 is configured to convert the electrical signal 6 into an optical signal 6. The optical multiplexer 232 is further configured to send the optical signal 6.

Correspondingly, the optical transmission component 120 further includes a photodetector 123 connected to the optical multiplexer 122, and the optical transmission component 130 further includes a photodetector 133 connected to the optical multiplexer 132. The optical multiplexer 122 is configured to: receive the optical signal 5 sent by the optical network apparatus 200, and output the optical signal 5 to the photodetector 123. The photodetector 123 is configured to convert the optical signal 5 into the electrical signal 5. The optical multiplexer 132 is configured to: receive the optical signal 6 sent by the optical network apparatus 200, and output the optical signal 6 to the photodetector 133. The photodetector 133 is configured to convert the optical signal 6 into the electrical signal 6. Optionally, the optical transmission component 120 in this embodiment further includes a trans-impedance amplifier 124, and the trans-impedance amplifier 124 is connected to the photodetector 123. The photodetector 123 outputs, to the trans-impedance amplifier 124, the electrical signal 5 obtained through conversion. The trans-impedance amplifier 124 amplifies the electrical signal 5, and then sends the amplified electrical signal 5 to a processing chip 110. The optical transmission component 130 may further include a trans-impedance amplifier 134, and the trans-impedance amplifier 134 is connected to the photodetector 133. The photodetector 133 outputs, to the trans-impedance amplifier 134, the electrical signal 6 obtained through conversion. The trans-impedance amplifier 134 amplifies the electrical signal 6, and then sends the amplified electrical signal 6 to the processing chip 110. The processing chip 110 is configured to: process the electrical signal 5 and the electrical signal 6, to obtain the N electrical signals, and send the N electrical signals to the board interface chip.

This embodiment is described from the perspective of a direction in which the optical network apparatus 200 sends a signal and the optical network apparatus 100 receives the signal. For sending the optical signal 5 and the optical signal 6 by the optical network apparatus 200, refer to related descriptions of sending the optical signal 1 and the optical signal 2 by the optical network apparatus 100. For receiving the optical signal 5 and the optical signal 6 by the optical network apparatus 100, refer to related descriptions of receiving the optical signal 1 and the optical signal 2 by the optical network apparatus 200. Details are not described herein again.

Therefore, the optical multiplexer 122 may send the optical signal 1 and receive the optical signal 5, the optical multiplexer 132 may send the optical signal 2 and receive the optical signal 6, the optical multiplexer 222 may receive the optical signal 1 and send the optical signal 5, and the optical multiplexer 232 may receive the optical signal 2 and send the optical signal 6. To ensure that a same optical multiplexer sends an optical signal and receives an optical signal, because one optical multiplexer is connected to one optical fiber, a wavelength of an optical signal sent by the optical multiplexer is different from a wavelength of an optical signal received by the same optical multiplexer. Therefore, in this embodiment, a wavelength of the optical signal 1 is different from a wavelength of the optical signal 5, and a wavelength of the optical signal 2 is different from a wavelength of the optical signal 6.

Each optical transmission component may send an optical signal to the outside, or may receive an optical signal from the outside, and a wavelength of the optical signal received by an optical transmission component is different from a wavelength of the optical signal sent by the optical transmission component. Therefore, to ensure that the optical network apparatus 100 can still communicate with the optical network apparatus 200 over two optical fibers, one optical transmission component in the optical network apparatus is connected to one optical fiber, and the other optical transmission component is connected to the other optical fiber. Therefore, if one optical fiber is faulty, receive and transmit functions can still be implemented through the other optical fiber, to ensure normal communication between the two optical network apparatuses. Moreover, there is a transmit direction and a receive direction in a same optical fiber, so that delay consistency can be ensured. For example, the electrical-to-optical conversion module 121 in the optical transmission component 120 converts an electrical signal into an optical signal whose wavelength is $\lambda 1$, and the optical multiplexer 122, for example, includes a lens, can transmit an optical signal whose wavelength is $\lambda 1$ and reflect an optical signal whose wavelength is $\lambda 2$. Therefore, when receiving the optical signal whose wavelength is $\lambda 1$, the optical multiplexer 122 transmits the optical signal to an outside, that is, sends the optical signal to the optical network apparatus 200 over an optical fiber. When receiving an optical signal whose wavelength is $\lambda 2$, the electrical-to-optical conversion module 121 reflects the optical signal to the photodetector 123. For example, $\lambda 1=1295.56$ nm, and $\lambda 2=1309.14$ nm, but this embodiment is not limited thereto.

In some embodiments, the wavelength of the optical signal 1 is the same as the wavelength of the optical signal 6, and the wavelength of the optical signal 2 is the same as the wavelength of the optical signal 5.

As shown in FIG. 11A and FIG. 11B, in the optical network apparatus 100, the wavelength of the optical signal 1 sent by the optical transmission component 120 is $\lambda 1$, the wavelength of the optical signal 5 received by the optical transmission component 120 is $\lambda 2$, the wavelength of the optical signal 6 received by the optical transmission component 130 is $\lambda 1$, and the wavelength of the optical signal 5 sent by the optical transmission component 130 is $\lambda 2$. In the optical network apparatus 200, the wavelength of the optical signal 6 sent by the optical transmission component 230 is $\lambda 1$, the wavelength of the optical signal 2 received by the optical transmission component 230 is $\lambda 2$, the wavelength of the optical signal 1 received by the optical transmission component 220 is $\lambda 1$, and the wavelength of the optical signal 5 sent by the optical transmission component 220 is $\lambda 2$. Therefore, the optical network apparatus 100 and the optical network apparatus 200 shown in FIG. 11A and FIG. 11B have identical optical transmission components in an upper part and identical optical transmission components in a lower part. Therefore, when the optical network apparatus 100 communicates with the optical network apparatus 200 over the optical fibers, there is no need to distinguish between the two optical network apparatuses, thereby avoiding a problem in the prior art that single-fiber bidirectional optical modules need to be used in matched pairs, so that a user habit does not need to be changed.

It can be learned from the foregoing analysis that the optical network apparatus uses the single-fiber bidirectional technology. In another application scenario that has a high requirement on optical fiber symmetry, for example, in a 1588 service, 1588 packet exchange between network elements at two ends requires that path lengths in a receive direction and a transmit direction are the same. A larger length difference indicates poorer performance. However, in the single-fiber bidirectional technology, optical signals in the transmit direction and the receive direction are transmitted over a same optical fiber, thereby avoiding a problem that the optical fibers in the transmit direction and the receive direction have different lengths, and implementing better 1588 performance.

In some embodiments, the optical transmission component 120, the optical transmission component 130, the optical transmission component 220, and the optical transmission component 230 each are TO-packaged. The optical transmission component 120 is used as an example for description. The photodetector 123 and the trans-impedance amplifier 124 in the optical transmission component may be packaged together as a module through TO packaging. In addition, the electrical-to-optical conversion module 121 may also be packaged as a module through TO packaging. Such a TO packaging technique has a very complete industry chain. In the prior art, all optical-to-electrical modules in an optical network apparatus are generally packaged together through BOX packaging, and all electrical-to-optical modules are packaged together through BOX packaging. Such a packaging form is much more complex than the TO packaging in a manufacturing technique, and corresponding costs are also higher accordingly. Therefore, in this embodiment, relatively low costs may be implemented through TO packaging.

In addition, the embodiments of this application may be applied to a 100GBASE-ER4 interface, a 40GE interface, a 100G OTU4 interface, and the like, to reduce costs.

In addition, an embodiment of this application further provides an optical module. The optical module includes an optical network apparatus. The optical network apparatus may use the structure of the optical network apparatus 100 or the optical network apparatus 200. Implementation principles and technical effects of the optical apparatus, and the optical network apparatus 100 or the optical network apparatus 200 are similar, and details are not described herein again.

Figure 12:
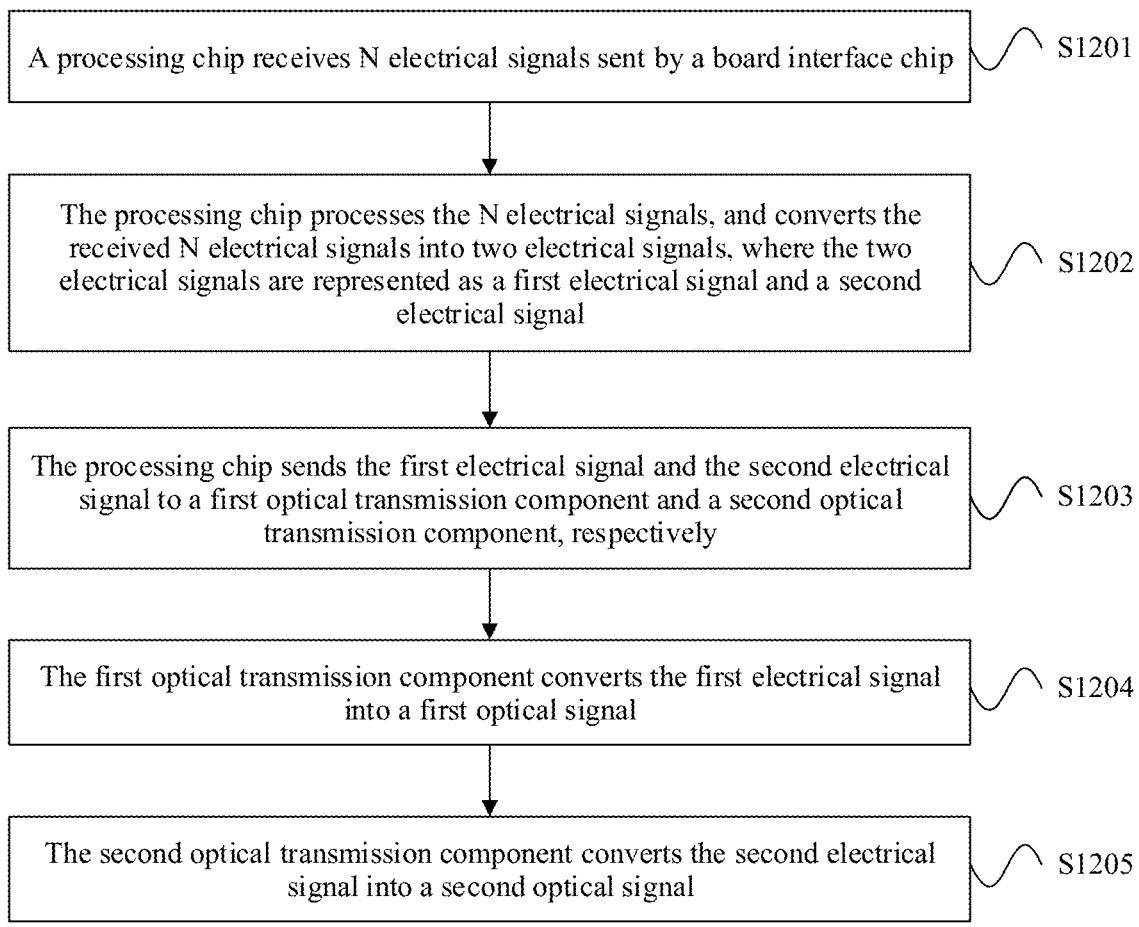
FIG. 12 is a flowchart of a signal processing method according to an embodiment of this application.

In addition, as shown in FIG. 12, FIG. 12 is a flowchart of a signal processing method according to an embodiment of this application. The method in this embodiment may be applied to a first optical network apparatus. The first optical network apparatus includes a processing chip, a first optical transmission component, and a second optical transmission component. An input end of the first optical transmission component is coupled to an output end of the processing chip, and an input end of the second optical transmission component is coupled to an output end of the processing chip. The method may include the following operations.

S1201. The processing chip receives N electrical signals sent by a board interface chip, where N is an integer greater than 2.

S1202. The processing chip processes the N electrical signals, and converts the received N electrical signals into two electrical signals, where the two electrical signals are represented as a first electrical signal and a second electrical signal.

S1203. The processing chip sends the first electrical signal and the second electrical signal to the first optical transmission component and the second optical transmission component, respectively.

S1204. The first optical transmission component converts the first electrical signal into a first optical signal.

S1205. The second optical transmission component converts the second electrical signal into a second optical signal.

In this embodiment, a sequence in which S1204 and S1205 are performed is not limited.

The processing chip may be the processing chip 110 in the foregoing embodiments, the first optical transmission component may be the optical transmission component 120 in the foregoing embodiments, the first electrical signal may be the electrical signal 1 in the foregoing embodiments, the first optical signal may be the optical signal 1 in the foregoing embodiments, the second optical transmission component may be the optical transmission component 130 in the foregoing embodiments, the second electrical signal may be the electrical signal 2 in the foregoing embodiments, and the second optical signal may be the optical signal 2 in the foregoing embodiments. For a specific implementation process, refer to related descriptions in the foregoing embodiments, and details are not described herein again.

Figure 13:
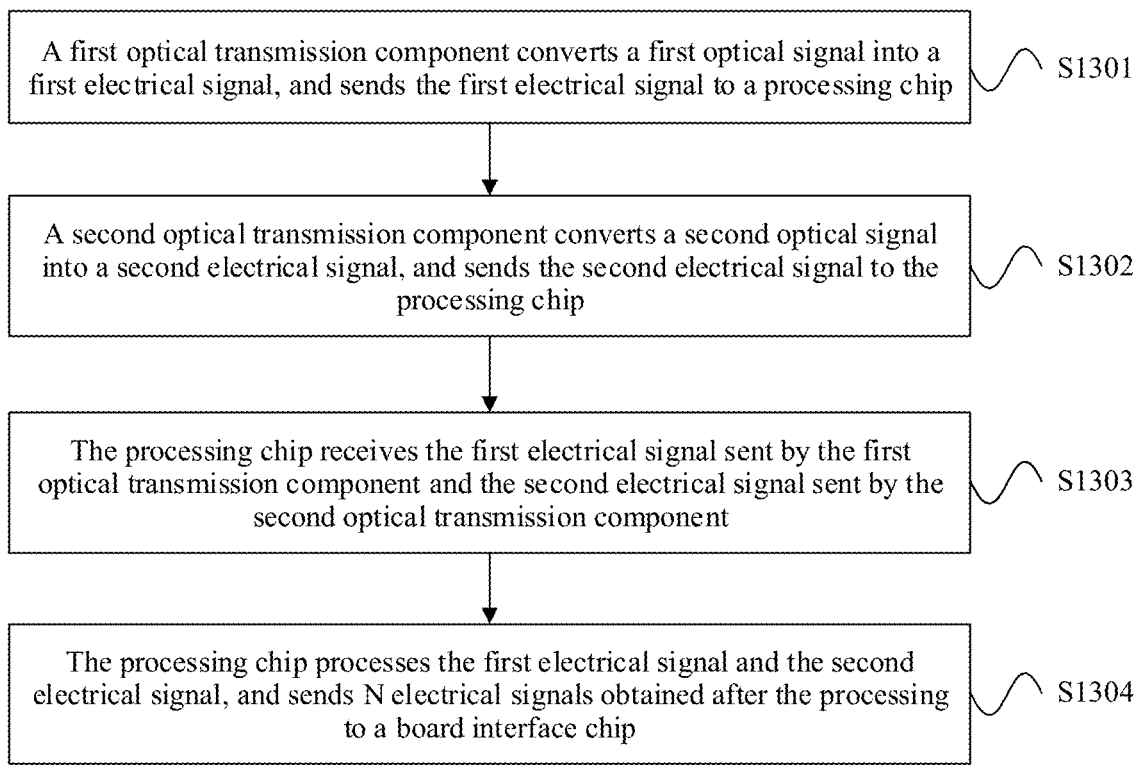
FIG. 13 is a flowchart of a signal processing method according to another embodiment of this application.

In addition, FIG. 13 is a flowchart of a signal processing method according to another embodiment of this application. The method in this embodiment may be applied to a second optical network apparatus. The second optical network apparatus includes a processing chip, a first optical transmission component, and a second optical transmission component. An output end of the first optical transmission component is coupled to an input end of the processing chip, and an output end of the second optical transmission component is coupled to an input end of the processing chip. The method may include the following operations.

S1301. The first optical transmission component converts a first optical signal into a first electrical signal, and sends the first electrical signal to the processing chip.

S1302. The second optical transmission component converts a second optical signal into a second electrical signal, and sends the second electrical signal to the processing chip.

A sequence in which S1301 and S1302 are performed is not limited.

S1303. The processing chip receives the first electrical signal sent by the first optical transmission component and the second electrical signal sent by the second optical transmission component.

S1304. The processing chip processes the first electrical signal and the second electrical signal, and sends N electrical signals obtained after the processing to a board interface chip, where N is an integer greater than 2.

The processing chip may be the processing chip 210 in the foregoing embodiments, the first optical transmission component may be the optical transmission component 220 in the foregoing embodiments, the first electrical signal may be the electrical signal 1 or the electrical signal 3 in the foregoing embodiments, the first optical signal may be the optical signal 1 or the optical signal 3 in the foregoing embodiments, the second optical transmission component may be the optical transmission component 230 in the foregoing embodiments, the second electrical signal may be the electrical signal 2 or the electrical signal 4 in the foregoing embodiments, and the second optical signal may be the optical signal 2 or the optical signal 4 in the foregoing embodiments. For a specific implementation process, refer to related descriptions in the foregoing embodiments, and details are not described herein again.

All of this specification is described in a progressive manner, for same or similar parts in the embodiments, refer to these embodiments, and each embodiment focuses on a difference from other embodiments. Especially, the method embodiments are described briefly because the method embodiments are basically similar to the product embodiments. For related parts, refer to descriptions in the product embodiments.

The units described as separate parts may or may not be physically separate. A component displayed as a unit may be or may not be a physical unit. That is, the units may be located in one position, or may be distributed on a plurality of network units. Some or all of the units may be selected based on actual requirements to achieve objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware and software.

In summary, it should be noted that what is described above is merely example embodiments of the technical solutions of this application, but is not intended to limit the protection scope of this application. Obviously, a person skilled in the art can make various modifications and variations to this application without departing from the scope of this application. If these modifications and variations of this application fall within the scope of the claims of this application and their equivalent technologies, any modifications, equivalent replacements, and improvements made shall fall within the protection scope of this application.

What is claimed is:

1. A first optical network apparatus, comprising:
a first optical transmission component;
a second optical transmission component; and
a processing chip comprising a first 50GAUI-1 interface and a second 50GAUI-1 interface, wherein the processing chip is connected to the first optical transmission component through the first 50GAUI-1 interface, and is connected to the second optical transmission component through the second 50GAUI-1 interface,
wherein the processing chip is configured to:
receive N electrical signals from a board interface chip, wherein N is an integer greater than 2,
convert the N electrical signals into a first electrical signal and a second electrical signal to have fewer than N optical transmission components, and
send the first electrical signal and the second electrical signal to the first optical transmission component and the second optical transmission component, respectively, wherein the first optical transmission component is configured to:
convert the first electrical signal into a first optical signal whose wavelength is $\lambda 1$,
send the first optical signal to a second optical network apparatus using a first fiber connected to the first optical transmission component, and
receive an optical signal whose wavelength is $\lambda 2$ from the second optical network apparatus;
wherein the second optical transmission component is configured to:
convert the second electrical signal into a second optical signal whose wavelength is $\lambda 2$,
send the second optical signal to the second optical network apparatus using a second optical fiber connected to the second optical transmission component; and
receive an optical signal whose wavelength is $\lambda 1$ from the second optical network apparatus.

2. The optical network apparatus according to claim 1, wherein the processing chip comprises a 100 Gbps attachment unit (CAUI-4) interface, and when the board interface chip is a 100G board interface chip, the processing chip is connected to the 100G board interface chip through the CAUI-4 interface.

3. The optical network apparatus according to claim 2, wherein the board interface chip is the 100G board interface chip, N=4, the N electrical signals include electrical signals A1 to A4, and the processing chip further comprises a first circuit, a second circuit, and a third circuit,
wherein the first circuit is configured to perform physical medium attachment (PMA) processing and physical coding sublayer (PCS) conversion processing on the electrical signals A1 to A4 to obtain eight electrical signals B1 to B8;
wherein the second circuit is configured to:
perform forward error correction (FEC) encoding and PMA (2:2) processing on the electrical signals B1 to B4, to obtain an electrical signal C1 and an electrical signal C2, and
perform the FEC encoding and the PMA (2:2) processing on the electrical signals B5 to B8 to obtain an electrical signal C3 and an electrical signal C4, and
wherein the third circuit is configured to:
perform PMA (2:1) processing on the electrical signal C1 and the electrical signal C2 to obtain the first electrical signal, and
perform the PMA (2:1) processing on the electrical signal C3 and the electrical signal C4 to obtain the second electrical signal.

4. The optical network apparatus according to claim 3, wherein in performing PMA processing and PCS conversion processing on the electrical signals A1 to A4, the first circuit is further configured to:
perform PMA (20:4) processing on the electrical signals A1 to A4 to obtain 20 electrical signals D1 to D20; and
perform the PCS conversion processing on the electrical signals D1 to D20 to obtain the electrical signals B1 to B8.

5. The optical network apparatus according to claim 1, wherein the processing chip comprises a first 50 Gbps attachment unit (50GAUI-2) interface and a second 50GAUI-2 interface, and when the board interface chip is a 50G board interface chip, the processing chip is connected to the 50G board interface chip through the first 50GAUI-2 interface and the second 50GAUI-2 interface.

6. The optical network apparatus according to claim 5, wherein the board interface chip is the 50G board interface chip, N is equal to 4, and the N electrical signals include electrical signals A1 to A4;
the processing chip is configured to: receive the electrical signals A1 and A2 over the first 50GAUI-2 interface and receive the electrical signals A3 and A4 over the second 50GAUI-2 interface; and
wherein the processing chip further comprises a third circuit configured to:
perform PMA (2:1) processing on the electrical signals A1 and A2 to obtain the first electrical signal; and perform the PMA (2:1) processing on the electrical signals A3 and A4 to obtain the second electrical signal.

7. The optical network apparatus according to claim 1, wherein
the first optical transmission component comprises:
a first electrical-to-optical conversion module to convert the first electrical signal into the first optical signal, and
a first optical multiplexer to send the first optical signal to the second optical network apparatus; and
the second optical transmission component comprises:
a second electrical-to-optical conversion module to convert the second electrical signal into the second optical signal, and
a second optical multiplexer to send the second optical signal to the second optical network apparatus.

8. The optical network apparatus according to claim 7, wherein the first optical transmission component further comprises a first photodetector connected to the first optical multiplexer, and the second optical transmission component further comprises a second photodetector connected to the second optical multiplexer;
the first optical multiplexer is configured to: receive a third optical signal from the second optical network apparatus, and output the third optical signal to the first photodetector, and the first photodetector is configured to convert the third optical signal into a third electrical signal;
the second optical multiplexer is configured to: receive a fourth optical signal from the second optical network apparatus, and output the fourth optical signal to the second photodetector, and the second photodetector is configured to convert the fourth optical signal into a fourth electrical signal; and
the processing chip is configured to: process the third electrical signal and the fourth electrical signal, and send the N electrical signals obtained after the processing to the board interface chip, wherein
a wavelength of the first optical signal is different from a wavelength of the third optical signal, and the wavelength of the first optical signal is the same as a wavelength of the fourth optical signal;
a wavelength of the second optical signal is different from the wavelength of the fourth optical signal, and the wavelength of the second optical signal is the same as the wavelength of the third optical signal.

9. The optical network apparatus according to claim 1, wherein the first optical transmission component and the second optical transmission component each are packaged by using a transistor outline (TO) packaging.

10. A second optical network apparatus, comprising:
a processing chip comprising a first 50GAUI-1 interface and a second 50GAUI-1 interface, wherein the processing chip is connected to a first optical transmission component through the first 50GAUI-1 interface, and is connected to a second optical transmission component through the second 50GAUI-1 interface;
the first optical transmission component configured to:
convert a first optical signal whose wavelength is λ1 into a first electrical signal,
send the first electrical signal to the processing chip,
send an optical signal whose wavelength is λ2 to a first optical network apparatus using a first fiber connected to the first optical transmission component, and
receive the first optical signal from the first optical network component; and
the second optical transmission component configured to:
convert a second optical signal whose wavelength is λ2 into a second electrical signal, and send the second electrical signal to the processing chip;
send an optical signal whose wavelength is λ1 to the first optical network apparatus using a second optical fiber connected to the second optical transmission component; and
receive the second optical signal from the first optical network apparatus,
wherein the processing chip is configured to:
receive the first electrical signal and the second electrical signal; and
process the first electrical signal and the second electrical signal, and send N electrical signals obtained after the processing to a board interface chip, wherein N is an integer greater than 2.

11. The optical network apparatus according to claim 10, wherein the processing chip comprises a 100 Gbps attachment unit (CAUI-4) interface, and
when the board interface chip is a 100G board interface chip, the processing chip is connected to the 100G board interface chip through the CAUI-4 interface.

12. The optical network apparatus according to claim 11, wherein the board interface chip is the 100G board interface chip, N=4, the N electrical signals include electrical signals A1 to A4, and the processing chip further comprises a first circuit, a second circuit, and a third circuit,
wherein the third circuit is configured to:
perform physical medium attachment (PMA) (2:1) processing on the first electrical signal to obtain an electrical signal C1 and an electrical signal C2,
perform the PMA (2:1) processing on the second electrical signal to obtain an electrical signal C3 and an electrical signal C4,
wherein the second circuit is configured to:
perform PMA (2:2) processing and forward error correction (FEC) encoding on the electrical signals C1 and C2 to obtain electrical signals B1 to B4,
perform the PMA (2:2) processing and the FEC decoding on the electrical signals C3 and C4 to obtain electrical signals B5 to B8, and
wherein the first circuit is configured to: perform physical coding sublayer (PCS) conversion processing and PMA processing on the electrical signals B1 to B8 to obtain the electrical signals A1 to A4.

13. The optical network apparatus according to claim 12, wherein in performing PCS conversion processing and PMA processing on the electrical signals B1 to B8, the first circuit is to:
perform the PCS conversion processing on the electrical signals B1 to B8 to obtain 20 electrical signals D1 to D20, and
perform PMA (20:4) processing on the electrical signals D1 to D20 to obtain the electrical signals A1 to A4.

14. The optical network apparatus according to claim 10, wherein the processing chip comprises a first 50 Gbps attachment unit (50GAUI-2) interface and a second 50GAUI-2 interface, and wherein when the board interface chip is a 50G board interface chip, the processing chip is connected to the 50G board interface chip through the first 50GAUI-2 interface and the second 50GAUI-2 interface.

15. The optical network apparatus according to claim 14, wherein the board interface chip is the 50G board interface chip, N is equal to 4, and the N electrical signals include electrical signals A1 to A4;

the processing chip sends the electrical signal A1 and the electrical signal A2 to the board interface chip over the first 50GAUI-2 interface and sends the electrical signal A3 and the electrical signal A4 to the board interface chip over the second 50GAUI-2 interface; and the processing chip further comprises a third circuit configured to:

perform PMA (2:1) processing on the first electrical signal to obtain the electrical signal A1 and the electrical signal A2, and perform the PMA (2:1) processing on the second electrical signal to obtain the electrical signal A3 and the electrical signal A4.

16. The optical network apparatus according to claim 10, wherein the first optical transmission component and the second optical transmission component each are packaged by using a transistor outline TO packaging.

17. An optical module, comprising:

an optical network apparatus, wherein the optical network apparatus comprises:

a first optical transmission component;

a second optical transmission component; and a processing chip comprising a first 50GAUI-1 interface and a second 50GAUI-1 interface, wherein the processing chip is connected to the first optical transmission component through the first 50GAUI-1 interface, and is connected to the second optical transmission component through the second 50GAUI-1 interface, wherein the processing chip is configured to receive N electrical signals from a board interface chip, wherein N is an integer greater than 2, convert the N electrical signals into a first electrical signal and a second electrical signal to have fewer than N optical transmission components, and send the first electrical signal and the second electrical signal to the first optical transmission component and the second optical transmission component, respectively, wherein the first optical transmission component is configured to convert the first electrical signal into a first optical signal whose wavelength is λ1, send the first optical signal to a second optical network apparatus using a first fiber connected to the first optical transmission component, and receive an optical signal whose wavelength is λ2 from the second optical network apparatus;

wherein the second optical transmission component is configured to:

convert the second electrical signal into a second optical signal whose wavelength is λ2, send the second optical signal to the second optical network apparatus using a second optical fiber connected to the second optical transmission component; and receive an optical signal whose wavelength is λ1 from the second optical network apparatus.

18. The optical module according to claim 17, wherein the processing chip comprises a 100 Gbps attachment unit (CAUI-4) interface, and when the board interface chip is a 100G board interface chip, the processing chip is connected to the 100G board interface chip through the CAUI-4 interface.

* * * * *